United States Patent
Katagi et al.

(10) Patent No.: US 11,535,700 B2
(45) Date of Patent: Dec. 27, 2022

(54) EPOXY POLYMER, EPOXY RESIN, EPOXY RESIN COMPOSITION, RESIN SHEET, B-STAGE SHEET, CURED PRODUCT, C-STAGE SHEET, METAL FOIL WITH RESIN, METAL SUBSTRATE AND METHOD FOR MANUFACTURING

(71) Applicant: Showa Denko Materials Co., Ltd., Tokyo (JP)

(72) Inventors: Hideyuki Katagi, Tokyo (JP); Naoki Maruyama, Tokyo (JP); Yuka Yoshida, Tokyo (JP); Tomoko Higashiuchi, Tokyo (JP); Yoshitaka Takezawa, Tokyo (JP)

(73) Assignee: Showa Denko Materials Co., Ltd., Tokyo (JP)

(*) Notice: Subject to any disclaimer, the term of this patent is extended or adjusted under 35 U.S.C. 154(b) by 470 days.

(21) Appl. No.: 16/491,654

(22) PCT Filed: Mar. 9, 2017

(86) PCT No.: PCT/JP2017/009549
§ 371 (c)(1),
(2) Date: Sep. 6, 2019

(87) PCT Pub. No.: WO2018/163367
PCT Pub. Date: Sep. 13, 2018

(65) Prior Publication Data
US 2021/0054136 A1   Feb. 25, 2021

(51) Int. Cl.
| | | |
|---|---|---|
| *C08G 59/62* | (2006.01) | |
| *B32B 15/04* | (2006.01) | |
| *C08G 59/06* | (2006.01) | |
| *C08G 59/24* | (2006.01) | |
| *C08K 3/04* | (2006.01) | |

(52) U.S. Cl.
CPC .......... *C08G 59/621* (2013.01); *B32B 15/043* (2013.01); *C08G 59/066* (2013.01); *C08G 59/245* (2013.01); *C08K 3/04* (2013.01); *B32B 2255/06* (2013.01); *B32B 2255/26* (2013.01)

(58) Field of Classification Search
CPC .. C08G 59/621; C08G 59/066; C08G 59/245; B32B 15/043; B32B 2255/06; B32B 2255/26; C08K 3/04
USPC ......................................................... 528/87
See application file for complete search history.

(56) References Cited

U.S. PATENT DOCUMENTS

| | | | |
|---|---|---|---|
| 2012/0149807 A1 | 6/2012 | Asaumi et al. | |
| 2015/0144835 A1* | 5/2015 | Kosugi | ................ C08L 61/06 252/73 |

FOREIGN PATENT DOCUMENTS

| | | |
|---|---|---|
| CN | 103917605 A | 7/2014 |
| CN | 104428340 A | 3/2015 |
| JP | 2004-331768 A | 11/2004 |
| JP | 4118691 B2 | 7/2008 |
| JP | 2010-95646 A | 4/2010 |
| JP | 2011-74366 A | 4/2011 |
| JP | 2013-227451 A | 11/2013 |
| JP | 2013-234313 A | 11/2013 |
| JP | 5397476 B2 | 1/2014 |
| JP | 2016-113540 A | 6/2016 |
| KR | 10-2015-0035769 A | 4/2015 |
| WO | WO-2014/007068 A1 | 1/2014 |
| WO | WO-2014007068 A1 * | 1/2014 ............. C08L 61/12 |

* cited by examiner

Primary Examiner — David T Karst
(74) Attorney, Agent, or Firm — Faegre Drinker Biddle & Reath LLP

(57) ABSTRACT

Provided is an epoxy polymer which has a mesogen skeleton and a structural unit represented by Formula (A). In Formula (A), each $R^5$ independently represents an alkyl group having from 1 to 8 carbon atoms, and n represents an integer of 0 to 3.

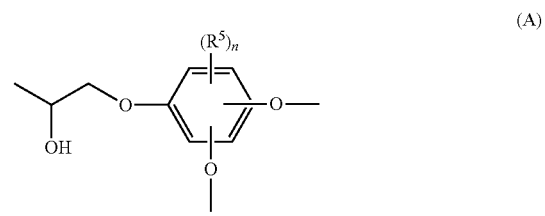

(A)

21 Claims, No Drawings

EPOXY POLYMER, EPOXY RESIN, EPOXY RESIN COMPOSITION, RESIN SHEET, B-STAGE SHEET, CURED PRODUCT, C-STAGE SHEET, METAL FOIL WITH RESIN, METAL SUBSTRATE AND METHOD FOR MANUFACTURING

TECHNICAL FIELD

The present invention relates to an epoxy polymer, an epoxy resin, an epoxy resin composition, a resin sheet, a B-stage sheet, a cured product, a C-stage sheet, a metal foil with a resin, a metal substrate, and a method of producing an epoxy resin.

BACKGROUND ART

In recent semiconductor package devices, it is important to implement heat dissipation measures since the actual operating temperature is likely to be high due to an increasing density and an increasing integration. Particularly, in the field of power devices that are used in electric cars, hybrid cars, industrial instruments and the like, the use of silicon carbide (SiC), which enables a further increase in output, in place of silicon has been studied, and there is a demand for the development of peripheral materials that have excellent heat resistance and high heat conduction characteristics. In addition, depending on the part to which silicon carbide is applied, such peripheral materials are required to have high insulation properties.

As members to be arranged in the peripheries of power devices, in association with the progress of size reduction and weight reduction in power devices, organic materials have been increasingly used in place of inorganic materials that have been used conventionally, such as ceramics. Such organic materials are used in the form of, for example, a composite material made of a mixture of an organic polymer (resin) and an inorganic filler.

Organic materials are advantageous in that, for example, they have superior processability and can be further reduced in weight as compared to inorganic materials; however, organic materials tend to have a lower thermal conductivity and a lower heat resistance than inorganic materials.

As a method of improving the thermal conductivity of an organic material, a method of mixing a resin with an inorganic filler that has a high thermal conductivity as typified by alumina, boron nitride or the like is known. In addition, a method of improving the thermal conductivity by introducing a rigid structure such as a mesogen skeleton into the molecules of a resin and utilizing the molecular stacking properties so as to allow the resin to exhibit liquid crystallinity or crystallinity and to thereby suppress phonon scattering is also known (see, for example, Patent Documents 1 and 2). In the former method, although the thermal conductivity of a composite material can be improved by increasing the amount of the inorganic filler to be added, the amount of the inorganic filler is limited from the standpoint of attaining satisfactory insulation properties at the same time. On the other hand, in the latter method where a resin having a high thermal conductivity is used, the thermal conductivity of a composite material can be dramatically improved while maintaining the insulation properties.

As a specific method of improving the thermal conductivity of a resin, for example, a method of applying an epoxy resin having a mesogen skeleton that exhibits crystallinity or liquid crystallinity may be employed. This enables to improve the thermal conductivity of a resin without having to increase the filling rate of a filler. However, since the melting point of the resin tends to be increased, there may be a problem in handling, such as a reduction in the fluidity at a molding temperature or a reduction in the adhesion between an adherend and the resin.

As a method of suppressing a reduction in the fluidity at a molding temperature, there is known a method in which a resin compatible with an epoxy resin having a mesogen skeleton that exhibits crystallinity or liquid crystallinity is blended to reduce the resin crystallinity or liquid crystallinity and to thereby improve the fluidity. However, in this method, since the stacking properties of a high-thermal-conductivity resin after curing is impaired, an increase in the thermal conductivity of the resulting composite material is not attained in some cases.

RELATED ART DOCUMENTS

Patent Documents

[Patent Document 1] Japanese Patent No. 4118691
[Patent Document 2] Japanese Patent No. 5397476

SUMMARY OF INVENTION

Technical Problem

As a method of attaining both suppression of a reduction in the fluidity at a molding temperature and an increase in the thermal conductivity, there is, for example, a method of producing an epoxy resin that has a lowered softening point and an improved ease of handling by allowing an epoxy compound having a mesogen skeleton to react with a dihydric phenol without deteriorating the higher-order structure-forming ability. However, this method has a problem in that, since the distance between crosslinking points is contrarily increased, the glass transition temperature of a cured product is lowered as compared to a case of using only the epoxy compound.

An object of one aspect of the invention is to provide: an epoxy polymer, an epoxy resin, an epoxy resin composition, a resin sheet, a B-stage sheet, and a metal foil with a resin, which are capable of yielding a cured product having a high glass transition temperature, and a cured product having a high glass transition temperature, a C-stage sheet and a metal substrate, which include the cured product, and a method of producing an epoxy resin.

Solution to Problem

Concrete means for solving the above-described problems include the following aspects.
<1> An epoxy polymer comprising:
a mesogen skeleton; and
a structural unit represented by the following Formula (A):

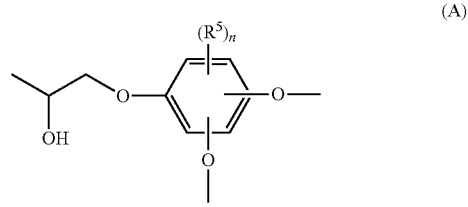

(wherein, each $R^5$ independently represents an alkyl group having from 1 to 8 carbon atoms; and n represents an integer of 0 to 3).
<2> The epoxy polymer according to <1>, comprising at least one selected from the group consisting of a structural unit represented by the following Formula (IA) and a structural unit represented by the following Formula (IB):

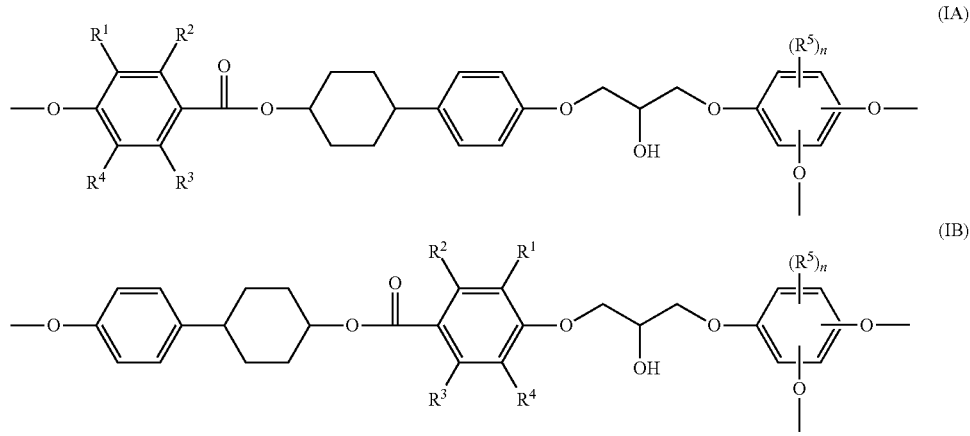

(wherein, each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer of 0 to 3).

<3> The epoxy polymer according to <1> or <2>, having a number-average molecular weight of from 1,000 to 3,000 as measured by gel permeation chromatography.

<4> The epoxy polymer according to any one of <1> to <3>, obtained by allowing an epoxy compound that has a mesogen skeleton and two epoxy groups to react with a trihydric phenol compound that has three hydroxy groups on a single benzene ring as substituents.

<5> The epoxy polymer according to <4>, wherein the trihydric phenol compound is at least one selected from the group consisting of 1,2,3-trihydroxybenzene, 1,2,4-trihydroxybenzene, and 1,3,5-trihydroxybenzene.

<6> The epoxy polymer according to <4> or <5>, wherein the trihydric phenol compound is at least one selected from the group consisting of 1,2,4-trihydroxybenzene and 1,3,5-trihydroxybenzene.

<7> The epoxy polymer according to any one of <4> to <6>, wherein the epoxy compound comprises a compound represented by the following Formula (I):

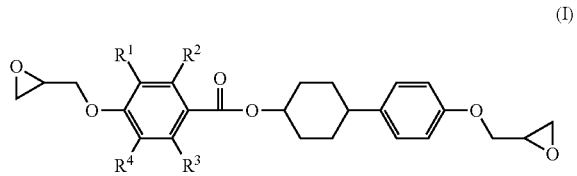

(wherein, each of $R^1$ to $R^4$ independently represents a hydrogen atom or an alkyl group having from 1 to 3 carbon atoms).

<8> The epoxy polymer according to any one of <4> to <7>, wherein the epoxy compound comprises trans-4-{4-(2,3-epoxypropoxy)phenyl}cyclohexyl=4-(2,3-epoxypropoxy)benzoate.

<9> An epoxy resin comprising the epoxy polymer according to any one of <1> to <8>.

<10> An epoxy resin composition comprising:
the epoxy resin according to <9>; and
a filler.

<11> The epoxy resin composition according to <10>, which is used as a binder of a carbon fiber-reinforced plastic (CFRP).

<12> The epoxy resin composition according to <10>, which is used as a sealing material or a molding material.

<13> The epoxy resin composition according to any one of <10> to <12>, having a glass transition temperature of 180° C. or higher when made into a cured product.

<14> The epoxy resin composition according to any one of <10> to <13>, having a diffraction peak in a diffraction angle (2θ) range of from 3.0° to 3.5° when made into a cured product, as determined by X-ray diffractometry using CuKα radiation.

<15> A resin sheet comprising a resin composition layer that contains the epoxy resin composition according to any one of <10> to <14>.

<16> A B-stage sheet comprising a semi-cured resin composition layer that contains a semi-cured product of the epoxy resin composition according to any one of <10> to <14>.

<17> A C-stage sheet comprising a cured resin composition layer that contains a cured product of the epoxy resin composition according to any one of <10> to <14>.

<18> A cured product of the epoxy resin composition according to any one of <10> to <14>.

<19> The cured product according to <18>, having a glass transition temperature of 180° C. or higher.

<20> The cured product according to <18> or <19>, having a diffraction peak in a diffraction angle (2θ) range of from 3.0° to 3.5° as determined by X-ray diffractometry using CuKα radiation.

<21> A metal foil with a resin, comprising:
a metal foil; and
a semi-cured resin composition layer which is arranged on the metal foil and comprises a semi-cured product of the epoxy resin composition according to any one of <10> to <14>.

<22> A metal substrate comprising:
a metal support;
a cured resin composition layer which is arranged on the metal support and comprises a cured product of the epoxy resin composition according to any one of <10> to <14>; and
a metal foil arranged on the cured resin composition layer.

<23> A method of producing an epoxy resin containing an epoxy polymer by allowing an epoxy compound that has a mesogen skeleton and two epoxy groups to react with a trihydric phenol compound that has three hydroxy groups on a single benzene ring as substituents.

<24> The method of producing an epoxy resin according to <23>, wherein the epoxy compound is allowed to react with the trihydric phenol compound, with a ratio (Ep/Ph) between the number of equivalents of the epoxy groups of the epoxy compound (Ep) and the number of equivalents of the phenolic hydroxy groups of the trihydric phenol compound (Ph) being set in a range of from 100/50 to 100/1.

<25> The method of producing an epoxy resin according to <23> or <24>, wherein the trihydric phenol compound is at least one selected from the group consisting of 1,2,3-trihydroxybenzene, 1,2,4-trihydroxybenzene, and 1,3,5-trihydroxybenzene.

Effects of Invention

According to one aspect of the invention, the followings can be provided: an epoxy polymer, an epoxy resin, an epoxy resin composition, a resin sheet, a B-stage sheet, and a metal foil with a resin, which are capable of yielding a cured product having a high glass transition temperature, and a cured product having a high glass transition temperature, a C-stage sheet and a metal substrate, which include the cured product, and a method of producing an epoxy resin.

DESCRIPTION OF EMBODIMENTS

Mode for Carrying Out the Invention

Embodiments of the invention are described below in detail. It is noted here, however, that the invention is not restricted to the below-described embodiments and may take various modes without departing from the gist thereof. In the below-described embodiments, the constituents thereof (including element steps and the like) are not indispensable unless otherwise specified. The same applies to the numerical values and ranges thereof, without restricting the invention.

The term "step" used herein encompasses not only steps discrete from other steps but also steps which cannot be clearly distinguished from other steps, as long as the intended purpose of the step is achieved.

In the present disclosure, those numerical ranges that are expressed with "to" each denote a range that includes the numerical values stated before and after "to" as the minimum value and the maximum value, respectively.

In a set of numerical ranges that are stated stepwise in the disclosure, the upper limit value or the lower limit value of a numerical range may be replaced with the upper limit value or the lower limit value of other numerical range. Further, in a numerical range stated in the disclosure, the upper limit or the lower limit of the numerical range may be replaced with a relevant value indicated in any of Examples.

In the disclosure, when there are plural kinds of substances that correspond to a component of a composition, the indicated content ratio of the component in the composition means, unless otherwise specified, the total content ratio of the plural kinds of substances existing in the composition.

In the disclosure, when there are plural kinds of particles that correspond to a component of a composition, the indicated particle size of the component in the composition means, unless otherwise specified, a value determined for a mixture of the plural kinds of particles existing in the composition.

The term "layer" used herein encompasses, when a region having the layer is observed, not only a case where the layer is formed on the entirety of the region but also a case where the layer is formed only a part of the region.

The term "layered" used herein indicates that layers are disposed on top of each other, and two or more layers may be bonded with each other or may be detachable from one another.

The term "mesogen skeleton" used herein refers to a molecular structure capable of expressing liquid crystallinity. Specific examples thereof include a biphenyl skeleton, a phenyl benzoate skeleton, a cyclohexylbenzoate skeleton, an azobenzene skeleton, a stilbene skeleton, and derivatives thereof. By using an epoxy polymer having a mesogen skeleton, a higher-order structure is likely to be formed when the epoxy polymer is cured, and the resulting cured product tends to have an improved thermal conductivity.

The term "higher-order structure" used herein means a structure containing a higher-order structure whose constituents are arranged to form a microscopic ordered structure and, for example, a crystal phase and a liquid-crystal phase correspond thereto. The presence or absence of such a higher-order structure can be easily determined by observation under a polarization microscope. In other words, it can be judged that a higher-order structure is present when interference fringes formed by depolarization are observed in a crossed Nicol state.

The higher-order structure usually exists in a cured product in the form of islands constituting a domain structure, and each of the islands corresponds to a higher-order structure. The constituents of this higher-order structure themselves are generally formed by covalent bonds.

<Epoxy Polymer>

The epoxy polymer of the present disclosure includes a mesogen skeleton and a structural unit represented by the below-described Formula (A). This enables to form a cured product having a high glass transition temperature from the epoxy polymer while lowering the softening point and maintaining the higher-order structure-forming ability. By increasing the glass transition temperature of the cured product, for example, in the field of power devices, a material which withstands an increase in the operating temperature due to application of silicon carbide (SiC) that allows a further increase in output can be obtained.

The structural unit represented by the following Formula (A) may be, for example, a structure derived from a reaction between an epoxy group and one of the hydroxy groups of a trihydric phenol compound that has three hydroxy groups on a single benzene ring as substituents.

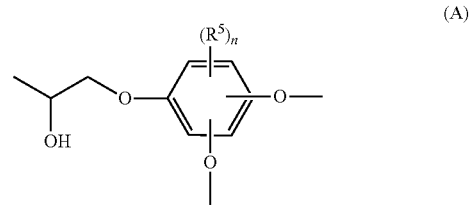

(A)

In Formula (A), each $R^5$ independently represents an alkyl group having from 1 to 8 carbon atoms, and n represents an integer of 0 to 3.

The alkyl group having from 1 to 8 carbon atoms optionally has a substituent. Examples of the substituent include an aryl group, a hydroxy group, and a halogen atom. It is noted here that the number of the carbon atoms of the substituent is not included in the number of the carbon atoms of the alkyl group.

In Formula (A), each $R^5$ independently is preferably an alkyl group having from 1 to 3 carbon atoms, more preferably a methyl group.

In Formula (A), n is preferably an integer of 0 to 2, more preferably 0 or 1, still more preferably 0. In other words, the benzene ring to which $R^5$ is bound in Formula (A) has preferably from one to three hydrogen atoms, more preferably two or three hydrogen atoms, still more preferably three hydrogen atoms.

The epoxy polymer of the disclosure preferably has at least one selected from the group consisting of a structural unit represented by the following Formula (IA) and a structural unit represented by the following Formula (IB).

The structural unit represented by Formula (A) may be included in the structural unit represented by Formula (IA) and the structural unit represented by Formula (IB).

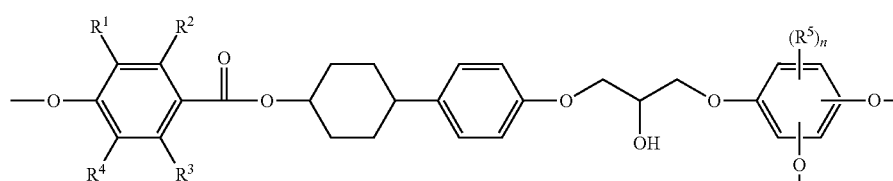

(IA)

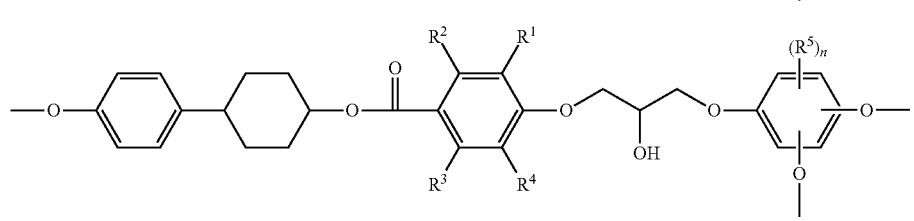

(IB)

In Formulae (IA) and (IB), each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer of 0 to 3.

The alkyl group having from 1 to 3 carbon atoms and the alkyl group having from 1 to 8 carbon atoms optionally have a substituent. Examples of the substituent include an aryl group, a hydroxy group, and a halogen atom. It is noted here that the number of the carbon atoms of the substituent is not included in the number of the carbon atoms of these alkyl groups.

In Formulae (IA) and (IB), each of $R^1$ to $R^4$ independently is preferably a hydrogen atom or an alkyl group having 1 or 2 carbon atoms, more preferably a hydrogen atom or a methyl group, still more preferably a hydrogen atom.

Further, preferably from two to four of $R^1$ to $R^4$, more preferably three or four of $R^1$ to $R^4$, still more preferably all four of $R^1$ to $R^4$ are hydrogen atoms. When any one of $R^1$ to $R^4$ is an alkyl group having from 1 to 3 carbon atoms, it is preferred that at least one of $R^1$ and $R^4$ is an alkyl group having from 1 to 3 carbon atoms.

In Formulae (IA) and (IB), $R^5$ have the same meaning as $R^5$ in Formula (A).

The epoxy polymer of the disclosure may be a compound containing two or more structural units represented by the following Formula (II) in one molecule.

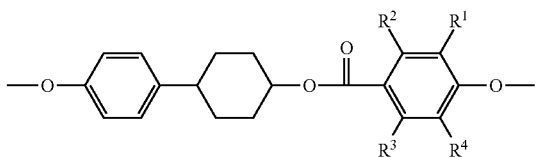

(II)

In Formula (II), each of $R^1$ to $R^4$ independently represents a hydrogen atom or an alkyl group having from 1 to 3 carbon atoms. A preferred constitution of $R^1$ to $R^4$ in Formula (II) is the same as that of $R^1$ to $R^4$ in Formulae (IA) and (IB).

The epoxy polymer of the disclosure is preferably an epoxy polymer obtained by allowing an epoxy compound that has a mesogen skeleton and two epoxy groups (hereinafter, also referred to as "epoxy compound") to react with a trihydric phenol compound that has three hydroxy groups on a single benzene ring as substituents (hereinafter, also referred to as "trihydric phenol compound"), more preferably an epoxy polymer obtained by allowing an epoxy compound that has a mesogen skeleton and two glycidyl groups to react with a trihydric phenol compound. By using an epoxy compound having two epoxy groups, a higher post-curing crosslinking density is attained and superior thermal conductivity thus tends to be obtained as compared to a case where an epoxy compound having a single epoxy group is used, and the polymerization reaction can be easily controlled and the possibility of gelation thus tends to be reduced as compared to a case where an epoxy compound having three or more epoxy groups is used.

The epoxy compound may be any monomer that has a mesogen skeleton and two epoxy groups. Examples of the epoxy compound include a biphenyl-type epoxy compound and a tricyclic epoxy compound.

The biphenyl-type epoxy compound may be any epoxy compound that has a biphenyl skeleton (excluding tricyclic epoxy compounds), and the biphenyl-type epoxy compound preferably has no ring other than the two benzene rings of the biphenyl skeleton (i.e., the biphenyl-type epoxy compound is preferably a bicyclic epoxy compound). Examples of the biphenyl-type epoxy compound include compounds represented by the following Formula (1).

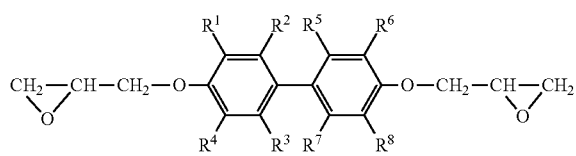

(1)

In Formula (1), each of $R^1$ to $R^8$ independently represents a hydrogen atom or a monovalent hydrocarbon group having from 1 to 10 carbon atoms. The monovalent hydrocarbon group represented by each of $R^1$ to $R^8$ optionally has a substituent. It is noted here that the number of the carbon atoms of the substituent is not included in the number of the carbon atoms of the hydrocarbon group.

The monovalent hydrocarbon group having from 1 to 10 carbon atoms may be, for example, an alkyl group having from 1 to 10 carbon atoms or an aryl group having from 6 to 10 carbon atoms. Examples of a substituent in the alkyl group include an aryl group, a hydroxy group, and a halogen atom. Examples of a substituent of the aryl group include an alkyl group, a hydroxy group, and a halogen atom.

The monovalent hydrocarbon group having from 1 to 10 carbon atoms is preferably a substituted or unsubstituted alkyl group having from 1 to 10 carbon atoms, more preferably an unsubstituted alkyl group having from 1 to 10 carbon atoms.

Examples of the substituted or unsubstituted alkyl group having from 1 to 10 carbon atoms include a methyl group, an ethyl group, a propyl group, a butyl group, an isopropyl group, and an isobutyl group.

In Formula (1), each of $R^1$ to $R^8$ independently is preferably a hydrogen atom or an unsubstituted alkyl group having from 1 to 6 carbon atoms, more preferably a hydrogen atom or an unsubstituted alkyl group having from 1 to 3 carbon atoms, still more preferably a hydrogen atom or a methyl group.

Specific examples of the biphenyl-type epoxy compound include 4,4'-bis(2,3-epoxypropoxy)biphenyl, 4,4'-bis(2,3-epoxypropoxy)-3,3',5,5'-tetramethylbiphenyl, and epoxy compounds obtained by a reaction between epichlorohydrin and 4,4'-biphenol or 4,4'-(3,3',5,5'-tetramethyl)biphenol. These biphenyl-type epoxy compounds may be used singly, or in combination of two or more kinds thereof.

Examples of a commercially available product of the biphenyl-type epoxy compound include "YX4000", "YX4000H" and "YL6121H" (all of which are manufactured by Mitsubishi Chemical Corporation); and "NC-3000" and "NC-3100" (both of which are manufactured by Nippon Kayaku Co., Ltd.). From the standpoint of reducing the melting point and improving the thermal conductivity, "YL6121H" (manufactured by Mitsubishi Chemical Corporation) is preferred.

From the standpoint of the thermal conductivity, the content ratio of the biphenyl-type epoxy compound with respect to the whole amount of the epoxy compound is preferably 30% by mole or lower, more preferably 25% by mole or lower, still more preferably 20% by mole or lower.

Examples of the tricyclic epoxy compound include epoxy compounds having three rings selected from the group consisting of a benzene ring and a cyclohexane ring. The three rings selected from the group consisting of a benzene ring and a cyclohexane ring may each be bound via a single bond or a divalent group. Examples of the divalent group include an oxygen atom, an ether group, and an ester group.

Such tricyclic epoxy compounds may be used singly, or in combination of two or more kinds thereof.

Specific examples of the tricyclic epoxy compound include epoxy compounds having a terphenyl skeleton, 1-(3-methyl-4-oxiranylmethoxyphenyl)-4-(4-oxiranylmethoxyphenyl)-1-cyclohexene, 1-(3-methyl-4-oxiranylmethoxyphenyl)-4-(4-oxiranylmethoxyphenyl)-benzene, and compounds represented by the following Formula (I). From the standpoint of further improving the thermal conductivity when the epoxy polymer is made into a cured product, the tricyclic epoxy compound is preferably a compound represented by the following Formula (I) (hereinafter, also referred to as "specific epoxy compound").

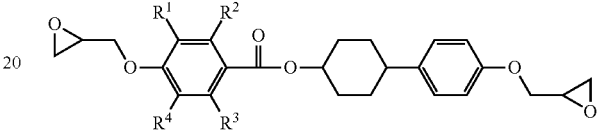

(I)

In Formula (I), each of $R^1$ to $R^4$ independently represents a hydrogen atom or an alkyl group having from 1 to 3 carbon atoms. $R^1$ to $R^4$ in Formula (I) have the same meanings as the above-described $R^1$ to $R^4$ in Formulae (IA) and (IB).

Specific examples of the specific epoxy compound include 4-{4-(2,3-epoxypropoxy)phenyl}cyclohexyl=4-(2,3-epoxypropoxy)benzoate, 4-{4-(2,3-epoxypropoxy)phenyl}cyclohexyl=4-(2,3-epoxypropoxy)-2-methylbenzoate, 4-{4-(2,3-epoxypropoxy)phenyl}cyclohexyl=4-(2,3-epoxypropoxy)-3-methylbenzoate, 4-{4-(2,3-epoxypropoxy)phenyl}cyclohexyl=4-(2,3-epoxypropoxy)-3-ethylbenzoate, 4-{4-(2,3-epoxypropoxy)phenyl}cyclohexyl=4-(2,3-epoxypropoxy)-2-isopropylbenzoate, and 4-{4-(2,3-epoxypropoxy)phenyl}cyclohexyl=4-(2,3-epoxypropoxy)-3,5-dimethylbenzoate. The specific epoxy compound is preferably at least one compound selected from the group consisting of 4-{4-(2,3-epoxypropoxy)phenyl}cyclohexyl=4-(2,3-epoxypropoxy)benzoate and 4-{4-(2,3-epoxypropoxy)phenyl}cyclohexyl=4-(2,3-epoxypropoxy)-3-methylbenzoate, more preferably 4-{4-(2,3-epoxypropoxy)phenyl}cyclohexyl=4-(2,3-epoxypropoxy)benzoate, still more preferably trans-4-{4-(2,3-epoxypropoxy)phenyl}cyclohexyl=4-(2,3-epoxypropoxy)benzoate.

The specific epoxy compound can be synthesized by, for example, the method described in Japanese Patent Application Laid-Open (JP-A) No. 2011-74366.

From the standpoint of the thermal conductivity, the content ratio of the tricyclic epoxy compound with respect to the whole amount of the epoxy compound is preferably not lower than 70% by mole, more preferably not lower than 75% by mole, still more preferably not lower than 80% by mole.

The trihydric phenol compound that has three hydroxy groups on a single benzene ring as substituents functions as a binder that polymerizes the above-described epoxy compound. Other examples of the binder that polymerizes the epoxy compound include amine compounds.

When the epoxy compound is polymerized using an amine compound, a secondary amine structure or a tertiary amine structure is formed in the resulting epoxy polymer; therefore, the storage stability of the polymer itself and that of an epoxy resin composition obtained by blending the polymer and a curing agent tend to be deteriorated, which is not preferred.

On the other hand, as described in the disclosure, it is preferred to polymerize the epoxy compound using, as a phenol compound, a trihydric phenol compound that has three hydroxy groups on a single benzene ring as substituents. By this, the glass transition temperature of a cured product obtained using the resulting epoxy polymer tends to be further increased while lowering the softening point and maintaining the higher-order structure-forming ability of the epoxy polymer.

The trihydric phenol compound is preferably at least one selected from the group consisting of 1,2,3-trihydroxybenzene, 1,2,4-trihydroxybenzene and 1,3,5-trihydroxybenzene and, from the standpoint of improving the thermal conductivity of a cured product obtained using the epoxy polymer, the trihydric phenol compound is more preferably at least one selected from the group consisting of 1,2,4-trihydroxybenzene and 1,3,5-trihydroxybenzene.

(Method of Synthesizing Epoxy Polymer)

The epoxy polymer of the disclosure may also be an epoxy polymer obtained by allowing an epoxy compound that has a mesogen skeleton and two epoxy groups to react with a trihydric phenol compound. A specific example of a method of synthesizing the epoxy polymer will now be described.

It is noted here that the epoxy polymer obtained by a reaction between the epoxy compound and the trihydric phenol compound may be in the form of a mixture with an unreacted epoxy compound.

The epoxy polymer is synthesized by, for example, dissolving the epoxy compound and the trihydric phenol compound in a solvent along with a curing catalyst and stirring the resultant with heating. The epoxy polymer may be synthesized by melting and allowing the epoxy compound to react with the trihydric phenol compound without using any solvent and, from the safety standpoint, the epoxy polymer may be synthesized using a solvent as described above.

The solvent is not particularly restricted as long as it can be heated to a temperature that is required for allowing the reaction between the epoxy compound and the trihydric phenol compound to favorably proceed. Specific examples of such a solvent include cyclohexanone, cyclopentanone, ethyl lactate, propylene glycol monomethyl ether, and N-methylpyrrolidone.

The amount of the solvent may be any amount as long as all of the epoxy compound, the trihydric phenol compound and the curing catalyst are dissolved in the solvent. Although the solubility varies depending on the types of the raw materials before the reaction, the type of the solvent and the like, the viscosity of an epoxy polymer solution obtained after the polymer synthesis is controlled in a preferred range as long as the amount of the solvent is from 20% by mass to 60% by mass with respect to the added solid content.

The type, the amount and the like of the curing catalyst used in the synthesis of the epoxy polymer are not particularly restricted, and an appropriate curing catalyst can be selected from the standpoints of the reaction rate, the reaction temperature, the storage stability and the like. Specific examples of the curing catalyst include imidazole compounds, organic phosphorus compounds, tertiary amines, and quaternary ammonium salts. These curing catalysts may be used singly, or in combination of two or more kinds thereof.

Thereamong, from the standpoint of the heat resistance of a cured product obtained using the epoxy polymer, the curing catalyst is preferably at least one selected from the group consisting of: organic phosphine compounds; compounds having intramolecular polarization that are obtained by adding a π bond-containing compound, such as maleic anhydride, a quinone compound (e.g., 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, or phenyl-1,4-benzoquinone), diazophenylmethane or a phenol resin, to an organic phosphine compound; and complexes formed by an organic phosphine compound and an organic boron compound (e.g., tetraphenyl borate, tetra-p-tolyl borate, or tetra-n-butyl borate).

Specific examples of the organic phosphine compounds include triphenyl phosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkyl phosphine, dialkylaryl phosphine, and alkyldiaryl phosphine.

The amount of the curing catalyst is not particularly restricted. From the standpoints of the reaction rate and the storage stability, the amount of the curing catalyst is preferably from 0.1% by mass to 1.5% by mass, more preferably from 0.2% by mass to 1.0% by mass, with respect to the total mass of the epoxy compound and the trihydric phenol compound.

The epoxy polymer can be synthesized using a glass flask for small-scale production, or a stainless-steel synthesis tank for large-scale production. A specific synthesis method is, for example, as follows.

First, the epoxy compound is loaded to a flask or a synthesis tank, and the solvent is added thereto, after which the flask or the synthesis tank is heated to a reaction temperature in an oil bath or using a heat medium so as to dissolve the epoxy compound. Then, the trihydric phenol compound is added to the resultant and, after confirming that the trihydric phenol compound has been dissolved in the solvent, the curing catalyst is further added to initiate the reaction. The resulting reaction solution is taken out after a prescribed period, whereby an epoxy polymer solution is obtained. Alternatively, by removing the solvent by distillation under reduced pressure with heating in the flask or the synthesis tank and taking out the resultant, the epoxy polymer can be obtained as a solid at room temperature (25° C.).

The epoxy polymer solution may also contain an unreacted epoxy compound along with the epoxy polymer.

The reaction temperature is not restricted as long as it is a temperature at which the reaction between an epoxy group and a phenolic hydroxy group proceeds in the presence of the curing catalyst, and the reaction temperature is, for example, preferably in a range of from 100° C. to 180° C., more preferably in a range of from 120° C. to 170° C. By controlling the reaction temperature at 100° C. or higher, the time required for completion of the reaction tends to be further shortened. Meanwhile, by controlling the reaction temperature at 180° C. or lower, the possibility of gelation tends to be reduced.

In the synthesis of the epoxy polymer, the ratio of the epoxy compound and the trihydric phenol compound can be modified. Specifically, the synthesis can be carried out with the ratio (Ep/Ph) between the number of equivalents of the epoxy groups of the epoxy compound (Ep) and the number of equivalents of the phenolic hydroxy groups of the trihydric phenol compound (Ph) being set in a range of from 100/50 to 100/1. From the standpoints of the fluidity of the epoxy resin composition as well as the heat resistance and the thermal conductivity of the cured product, the ratio Ep/Ph is preferably in a range of from 100/40 to 100/10, more preferably in a range of from 100/30 to 100/15. By controlling the ratio Ep/Ph to be 100/10 or less, an increase in the softening point of the resulting epoxy polymer tends to be suppressed, while by controlling the ratio Ep/Ph to be 100/40 or higher, deterioration of the heat resistance of the cured product, which is caused by a reduction in the crosslinking density, and a reduction in the thermal conductivity of the cured product tend to be suppressed.

<Epoxy Resin>

The epoxy resin of the disclosure contains the above-described epoxy polymer. The epoxy resin can be any epoxy resin as long as it contains at least the epoxy polymer, and the epoxy resin may be, for example, a mixture of the epoxy polymer and an epoxy compound.

The mesogen skeleton of the epoxy compound that may be contained in the epoxy resin is preferably the same as the mesogen skeleton of the epoxy polymer. Not only this makes the epoxy resin more likely to exhibit liquid crystallinity or crystallinity without deterioration of stacking properties, allowing a higher-order structure to be more easily formed, but also the thermal conductivity of the cured product tends to be improved. Further, since the softening point of the epoxy resin is lowered, the fluidity at a molding temperature can be improved as well.

For example, when the epoxy polymer is obtained by a reaction between an epoxy compound and a phenol compound, since the epoxy polymer and the epoxy compound that is unreacted have the same mesogen skeleton, the epoxy resin may be a mixture of the epoxy polymer and the unreacted epoxy compound.

Preferred ranges of the physical property values of the epoxy polymer and the epoxy resin containing the epoxy polymer will now be described.

The epoxy equivalent of the epoxy resin is determined by perchloric acid titration.

From the standpoint of attaining both satisfactory fluidity of the epoxy resin composition and satisfactory thermal conductivity of the cured product, the epoxy equivalent is preferably from 245 g/eq to 320 g/eq, more preferably from 250 g/eq to 310 g/eq, still more preferably from 260 g/eq to 305 g/eq.

Further, from the standpoint of attaining both satisfactory fluidity of the epoxy resin composition and satisfactory thermal conductivity of the cured product, the number-average molecular weight (Mn) of the epoxy resin, which is determined by gel permeation chromatography (GPC), is preferably from 500 to 1,200, more preferably from 550 to 1,100, still more preferably from 600 to 1,000.

It is preferred that the Mn of the epoxy resin, which is a mixture of the epoxy polymer and the epoxy compound (e.g., unreacted epoxy compound), satisfies the above-described numerical range.

Moreover, from the standpoint of attaining both satisfactory fluidity of the epoxy resin composition and satisfactory thermal conductivity of the cured product, the number-average molecular weight (Mn) of the epoxy polymer, which is determined by gel permeation chromatography (GPC), is preferably from 1,000 to 3,000, more preferably from 1,200 to 2,700, still more preferably from 1,400 to 2,500. When the Mn is 1,000 or higher, a reduction in the fluidity of the epoxy polymer caused by an increase in the crystallinity tends to be suppressed, while when the Mn is 3,000 or less, a reduction in the thermal conductivity of the cured product caused by a decrease in the crosslinking density tends to be suppressed.

The measurement by gel permeation chromatography can be performed using a commercially available apparatus. For example, a resin sample dissolved in tetrahydrofuran at a concentration of 5 mg/cm$^3$ may be measured at a flow rate of 1.0 cm$^2$/min using a pump: L-6000 (manufactured by Hitachi, Ltd.), columns: TSKgel G4000HR+G3000HR+G2000XL (manufactured by Tosoh Corporation), a detector: differential refractometer RI-8020 (manufactured by Tosoh Corporation), and an elution solvent: tetrahydrofuran (containing no stabilizer for chromatography, manufactured by Wako Pure Chemical Industries, Ltd.).

Further, a calibration curve is prepared using a polystyrene standard sample so as to calculate the number-average molecular weight (Mn) of the epoxy resin and that of the epoxy polymer in terms of polystyrene.

When the number-average molecular weight (Mn) of the epoxy polymer is determined from the epoxy resin containing the epoxy compound and the epoxy polymer, the number-average molecular weight (Mn) of the epoxy polymer may be determined using elution peaks other than the elution peak attributed to the epoxy compound.

The epoxy resin can be used as a material of an epoxy resin composition or adhesive sheet.

<Method of Producing Epoxy Resin>

The method of producing an epoxy resin according to the disclosure is a method of producing an epoxy resin containing an epoxy polymer by allowing an epoxy compound that has a mesogen skeleton and two epoxy groups to react with a trihydric phenol compound that has three hydroxy groups on a single benzene ring as substituents. In the method of producing an epoxy resin according to the disclosure, preferred conditions for the reaction of the epoxy compound and the trihydric phenol compound are the same as those described above for the method of synthesizing the epoxy polymer.

<Epoxy Resin Composition>

The epoxy resin composition of the disclosure contains at least the above-described epoxy resin and a filler. The epoxy resin composition of the disclosure has excellent fluidity and a high glass transition temperature as a cured product.

The epoxy resin composition of the disclosure may contain: an epoxy resin, which contains an epoxy polymer and an epoxy compound; and a filler.

The epoxy resin composition of the disclosure can be used as, for example, a sealing material or a molding material, and the epoxy resin composition can also be used as a binder of a carbon fiber-reinforced plastic (CFRP).

The epoxy resin composition of the disclosure contains a filler. By this, the thermal conductivity of the cured product is improved. Specific examples of the filler include boron nitride, alumina, silica, aluminum nitride, magnesium oxide, silicon oxide, aluminum hydroxide, and barium sulfate. These fillers may be used singly, or in combination of two or more kinds thereof.

Thereamong, from the standpoints of the fluidity of the epoxy resin composition and the thermal conductivity and the electrical insulation of the cured product, one or more fillers composed of magnesium oxide and aluminum oxide are preferably used. In this case, a small amount of boron nitride, alumina, silica or aluminum nitride may be added to the epoxy resin composition.

The filler may have a single peak or plural peaks in its particle size distribution curve drawn by plotting the particle size on the abscissa and the frequency on the ordinate. By using a filler having plural peaks in the particle size distribution curve, the fillability of the filler is improved, and the thermal conductivity of the cured product tends to be improved.

When the particle size distribution curve has a single peak, from the standpoint of the thermal conductivity of the cured product, the average particle size of the filler is preferably from 0.1 μm to 100 μm, more preferably from 0.1 μm to 70 μm. Meanwhile, when the particle size distribution curve has plural peaks, for example, a combination of two or more kinds of fillers having different average particle sizes can be used.

It is noted here that the "particle size distribution" of the filler refers to the cumulative-volume particle size distribution measured by a laser diffraction method. Further, the "average particle size" of the filler refers to the particle size at which the cumulative-volume particle size distribution, which is measured by a laser diffraction method, reaches 50%.

The measurement of the particle size distribution by a laser diffraction method can be performed using a laser diffraction-scattering particle size distribution analyzer (e.g., LS230 manufactured by Beckman Coulter, Inc.).

In the case of using three fillers having different average particle sizes in combination, a filler having an average particle size of from 40 μm to 100 μm, a filler having an average particle size of from 10 μm to 30 μm and a filler having an average particle size of from 0.1 μm to 8 μm may be used in combination.

Further, from the standpoint of the fillability of these fillers, the filler having an average particle size of from 40 μm to 100 μm, the filler having an average particle size of from 10 μm to 30 μm and the filler having an average particle size of from 0.1 μm to 8 μm may be mixed in ranges of from 50% by volume to 70% by volume, from 15% by volume to 25% by volume and from 15% by volume to 25% by volume, respectively, with respect to the total volume of the fillers.

The content ratio of the filler in the epoxy resin composition is not restricted and, from the standpoints of the thermal conductivity of the cured product and the moldability of the epoxy resin composition, it is preferably from 60% by volume to 90% by volume, more preferably from 70% by volume to 85% by volume, with respect to the total volume of the epoxy resin composition. By controlling the content ratio of the filler to be 60% by volume or higher, the thermal conductivity of the cured product tends to be improved, while by controlling the content ratio of the filler to be 90% by volume or less, an epoxy resin composition having excellent moldability tends to be obtained.

The content ratio (% by volume) of the filler in the epoxy resin composition of the disclosure is a value determined by the following equation.

Content ratio (% by volume) of filler=$\{(Ew/Ed)/((Aw/Ad)+(Bw/Bd)+(Cw/Cd)+(Dw/Dd)+(Ew/Ed)+(Fw/Fd)\}\times 100$ The variables in this equation are as follows.
Aw: Mass composition ratio (% by mass) of epoxy resin
Bw: Mass composition ratio (% by mass) of curing agent
Cw: Mass composition ratio (% by mass) of silane coupling agent (optional component)
Dw: Mass composition ratio (% by mass) of curing catalyst (optional component)
Ew: Mass composition ratio (% by mass) of filler
Fw: Mass composition ratio (% by mass) of other component(s) (optional component(s))
Ad: Specific gravity of epoxy resin
Bd: Specific gravity of curing agent
Cd: Specific gravity of silane coupling agent
Dd: Specific gravity of curing catalyst
Ed: Specific gravity of filler
Fd: Specific gravity of other component(s)

The epoxy resin composition may also contain, for example, a silane coupling agent, a curing agent, a curing catalyst, a mold release agent, a stress reliver, and/or a reinforcing material, in addition to the epoxy resin and the filler.

The epoxy resin composition may contain a silane coupling agent. This allows the surface of the filler and the epoxy resin surrounding the filler to interact with each other, whereby the fluidity of the epoxy resin composition and the thermal conductivity of the cured product can be improved and infiltration of water into the filler can be inhibited, so that the insulation reliability of the cured product tends to be improved. Particularly, from the standpoints of the interaction with the epoxy resin having a mesogen skeleton and the thermal conductivity of the cured product, a phenyl group-containing silane coupling agent is preferred.

The type of the phenyl group-containing silane coupling agent is not particularly restricted, and any commercially available one may be used. Specific examples thereof include 3-phenylaminopropyltrimethoxysilane, 3-phenylaminopropyltriethoxysilane, N-methylanilinopropyltrimethoxysilane, N-methylanilinopropyltriethoxysilane, 3-phenyliminopropyltrimethoxysilane, 3-phenyliminopropyltriethoxysilane, phenyltrimethoxysilane, phenyltriethoxysilane, diphenyldimethoxysilane, diphenyldiethoxysilane, triphenylmethoxysilane, and triphenylethoxysilane. These silane coupling agents may be used singly, or in combination of two or more kinds thereof.

The amount of the phenyl group-containing silane coupling agent to be used is preferably set such that the coating rate with respect to the total surface area of the filler (hereinafter, also referred to as "coating rate of the silane coupling agent") is from 0.4 to 0.8.

Coating rate of silane coupling agent=$\{$Minimum coating area ($m^2$/g) of silane coupling agent$\times$ Amount (g) of silane coupling agent to be used$\}$/$\{$Specific surface area ($m^2$/g) of inorganic filler$\times$Amount (g) of filler to be used$\}$ The minimum coating area of the silane coupling agent in the above equation is calculated by the following equation:

Minimum coating area ($m^2$/g) of silane coupling agent=$\{$Avogadro constant $(6.02\times 10^{23})(\text{mol}^{-1})\times$ Coating area per molecule $(13\times 10^{-20})(m^2)$ of silane coupling agent$\}$/Molecular weight (g/mol) of silane coupling agent As a method of measuring the specific surface area of the filler, a BET method is mainly applied. The BET method is a gas adsorption method in which inert gas molecules, such as nitrogen ($N_2$), argon (Ar) or krypton (Kr), are allowed to adsorb to solid particles and the specific surface area of the solid particles is determined from the amount of the thus adsorbed gas molecules. The measurement of the specific surface area can be performed using a specific surface area/pore distribution analyzer (e.g., SA3100 manufactured by Beckman Coulter, Inc.).

The coating rate of the silane coupling agent is 1 when the silane coupling agent covers the entirety of the filler surface. In this case, since the filler surface has no polar group such as a hydroxy group that reacts with the silane coupling agent, it is believed that unreacted silane coupling agent that does not react with the filler is generated.

The coating rate of the silane coupling agent is preferably from 0.4 to 0.8, more preferably from 0.5 to 0.7. When the coating rate of the silane coupling agent is 0.4 or higher, a molding defect tends to be unlikely to occur after molding of the epoxy resin composition. By controlling the coating rate of the silane coupling agent to be 0.8 or lower, the silane coupling agent that does not bind with the filler is prevented from inhibiting the binding of the filler and the epoxy resin, the crosslinking of the epoxy resin and the like, so that a reduction in the thermal conductivity of the cured product tends to be suppressed.

A method of adding the silane coupling agent to the epoxy resin composition is not particularly restricted, and specific examples thereof include an integral method of adding the silane coupling agent at the time of mixing other materials, such as the epoxy resin and the filler; a masterbatch method of mixing a certain amount of the silane coupling agent with a small amount of a resin and subsequently mixing the resultant with other materials such as the filler; and a pretreatment method of mixing the filler with the silane coupling agent to treat the filler surface with the silane coupling agent in advance prior to mixing them with other materials such as the epoxy resin.

Examples of the pretreatment method include a dry method in which an undiluted solution or a solution of the silane coupling agent is stirred at a high speed along with the filler and thereby uniformly dispersed for treatment; and a wet method in which the filler surface is treated with the silane coupling agent by preparing a slurry of the filler with a diluted solution of the silane coupling agent, or by directly immersing the filler in the silane coupling agent.

The epoxy resin composition may also contain a curing agent. The type of the curing agent is not particularly restricted, and any conventionally known curing agent can be used. Examples thereof include phenolic curing agents, such as low-molecular-weight phenol compounds and phenol resins obtained by converting such compounds into novolac.

Examples of the low-molecular-weight phenol compounds include monofunctional compounds, such as phenols, o-cresol, m-cresol, and p-cresol; bifunctional compounds, such as catechol, resorcinol, and hydroquinone; and tri-functional compounds, such as 1,2,3-trihydroxybenzene, 1,2,4-trihydroxybenzene, and 1,3,5-trihydroxybenzene.

Further, as the curing agent, a phenol resin obtained by converting any of the above-described low-molecular-weight phenol compounds into novolac, such as a phenol novolac resin obtained by converting any of the above-described low-molecular-weight phenol compounds into novolac through linking with a methylene chain or the like, can be used as well.

As the phenolic curing agents, from the standpoint of the thermal conductivity of the cured product, the above-described bifunctional compounds, and phenol novolac resins obtained by converting any of these low-molecular-weight bifunctional phenol compounds into novolac through linking with a methylene chain are preferred.

Specific examples of the phenol novolac resins include resins obtained by converting a single low-molecular-weight phenol compound into novolac, such as cresol-novolac resins, catechol-novolac resins, resorcinol-novolac resins, and hydroquinone-novolac resins; and resins obtained by converting two or more low-molecular-weight phenol compounds into novolac, such as catechol-resorcinol-novolac resins and resorcinol-hydroquinone-novolac resins.

It is preferred that such a phenol novolac resin contains a compound having a structural unit represented by at least one selected from the group consisting of the following Formulae (II-1) and (II-2).

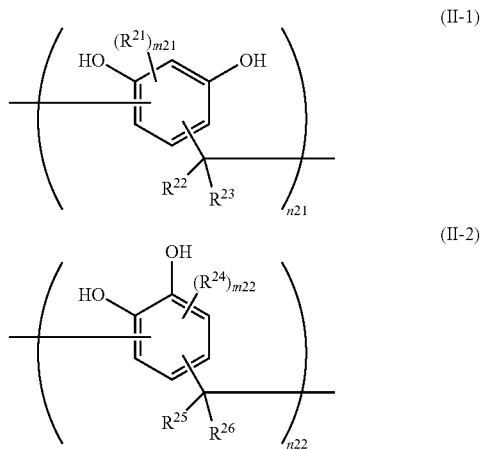

In Formulae (II-1) and (II-2), each of $R^{21}$ and $R^{24}$ independently represents an alkyl group, an aryl group, or an aralkyl group. The alkyl group, the aryl group or the aralkyl group represented by $R^{21}$ or $R^{24}$ optionally has a substituent. Examples of the substituent of the alkyl group include an aryl group, a hydroxy group, and a halogen atom. Examples of the substituent of the aryl group and that of the aralkyl group include an alkyl group, an aryl group, a hydroxy group, and a halogen atom.

It is noted here that the number of the carbon atoms of the substituent is not included in the number of the carbon atoms of the alkyl group, the aryl group or the aralkyl group.

Each of $R^{21}$ and $R^{24}$ independently is preferably an alkyl group having from 1 to 6 carbon atoms, an aryl group having from 6 to 12 carbon atoms or an aralkyl group having from 7 to 13 carbon atoms, more preferably an alkyl group having from 1 to 6 carbon atoms.

Further, each of m21 and m22 independently represents an integer of 0 to 2. When m21 is 2, the two $R^{21}$s may be the same or different; and when m22 is 2, the two $R^{24}$ may be the same or different. Each of m21 and m22 independently is preferably 0 or 1, more preferably 0.

Moreover, each of n21 and n22 independently represents an integer of 1 to 7, indicating the number of the structural units represented by Formula (II-1) or the structural units represented by (II-2) that are contained.

In Formulae (II-1) and (II-2), each of $R^{22}$, $R^{23}$, $R^{25}$ and $R^{26}$ independently represents a hydrogen atom, an alkyl group, an aryl group, or an aralkyl group. The alkyl group, the aryl group or the aralkyl group represented by $R^{22}$, $R^{23}$, $R^{25}$ or $R^{26}$ optionally has a substituent. Examples of the substituent of the alkyl group include an aryl group, a hydroxy group, and a halogen atom. Examples of the substituent of the aryl group and that of the aralkyl group include an alkyl group, an aryl group, a hydroxy group, and a halogen atom.

It is noted here that the number of the carbon atoms of the substituent is not included in the number of the carbon atoms of the alkyl group, the aryl group or the aralkyl group.

From the standpoints of the storage stability of the epoxy resin composition and the thermal conductivity of the cured product, $R^{22}$, $R^{23}$, $R^{25}$ and $R^{26}$ are each preferably a hydrogen atom, an alkyl group or an aryl group, more preferably a hydrogen atom, an alkyl group having from 1 to 4 carbon atoms or an aryl group having from 6 to 12 carbon atoms, still more preferably a hydrogen atom.

Further, from the standpoint of the heat resistance of the cured product, at least one of $R^{22}$ and $R^{23}$ or $R^{25}$ and $R^{26}$ is preferably an aryl group, more preferably an aryl group having from 6 to 12 carbon atoms.

The aryl group may contain a hetero atom in its aromatic group, and the aryl group is preferably a heteroaryl group whose total number of the hetero atom and carbon atoms is from 6 to 12.

The phenol novolac resin may contain a compound having the structural unit represented by Formula (II-1) or the structural unit represented by (II-2) singly, or a combination of two or more kinds of such compounds.

The compound having the structural unit represented by Formula (II-1) may further contain at least one partial structure derived from a low-molecular-weight phenol compound other than resorcinol. Examples of the low-molecular-weight phenol compound other than resorcinol in the compound having the structural unit represented by Formula (II-1) include phenol, cresol, catechol, hydroquinone, 1,2,3-trihydroxybenzene, 1,2,4-trihydroxybenzene, and 1,3,5-trihydroxybenzene. The compound having the structural unit represented by Formula (II-1) may contain a partial structure derived from any of these low-molecular-weight phenol compounds singly, or a combination of two or more kinds of such partial structures.

Further, the compound having a catechol-derived structural unit represented by Formula (II-2) may also contain at least one partial structure derived from a low-molecular-weight phenol compound other than catechol.

The term "partial structure derived from a low-molecular-weight phenol compound" used herein means a monovalent or divalent group formed by removing one or two hydrogen atoms from an aromatic ring moiety of a low-molecular-weight phenol compound. The position(s) from which a hydrogen atom(s) is/are removed is/are not particularly restricted.

In the compound having the structural unit represented by Formula (II-1), from the standpoints of the thermal conductivity of the cured product as well as the adhesion and the storage stability of the epoxy resin composition, the partial structure derived from a low-molecular-weight phenol compound other than resorcinol is preferably a partial structure derived from at least one selected from the group consisting of phenol, cresol, catechol, hydroquinone, 1,2,3-trihydroxybenzene, 1,2,4-trihydroxybenzene and 1,3,5-trihydroxybenzene, more preferably a partial structure derived from at least one selected from catechol and hydroquinone.

In the compound having the structural unit represented by Formula (II-1), the content ratio of a resorcinol-derived partial structure is not particularly restricted. The content ratio of the resorcinol-derived partial structure with respect to the total mass of the compound having the structural unit represented by Formula (II-1) is: preferably 55% by mass or higher from the standpoint of the elastic modulus; more preferably 60% by mass or higher, still more preferably 80% by mass or higher, from the standpoints of the Tg and the linear expansion coefficient of the cured product; particularly preferably 90% by mass or higher from the standpoint of the thermal conductivity of the cured product.

It is also preferred that the phenol novolac resin contains a compound having a structure represented by at least one selected from the group consisting of the following Formulae (III-1) to (III-4).

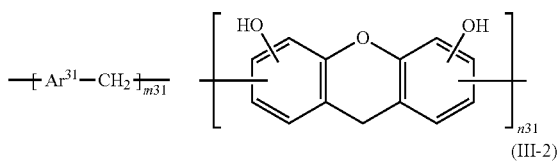

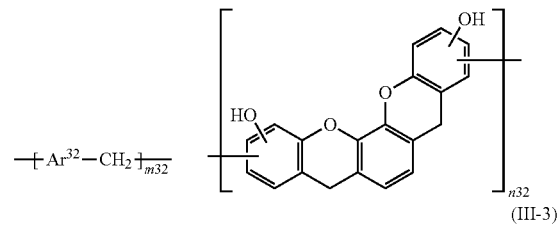

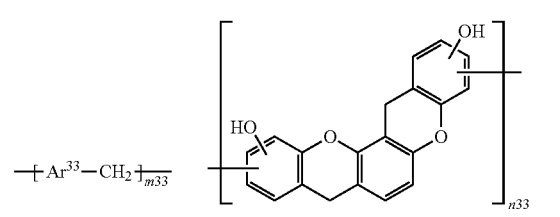

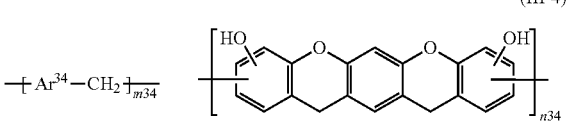

In Formulae (III-1) to (III-4), each of m31 to m34 and n31 to n34 independently represents a positive integer, and each of $Ar^{31}$ to $Ar^{34}$ independently represents any one of groups represented by the following Formula (III-a) and groups represented by the following Formula (III-b).

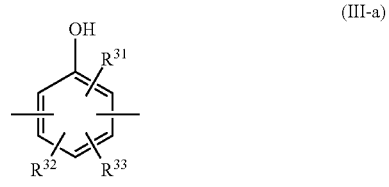

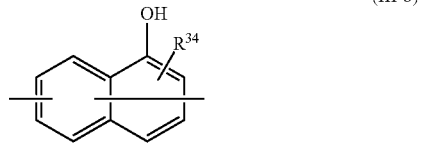

In Formulae (III-a) and (III-b), each of $R^{31}$ and $R^{34}$ independently represents a hydrogen atom or a hydroxy group, and each of $R^{32}$ and $R^{33}$ independently represents a hydrogen atom or an alkyl group having from 1 to 8 carbon atoms.

The structure represented by at least one selected from the group consisting of Formulae (III-1) to (III-4) may be contained as a main chain skeleton of the phenol novolac resin, or as a part of a side chain of the phenol novolac resin. Further, the respective structural units constituting the structure represented by any one of Formulae (III-1) to (III-4) may be contained randomly or regularly, or in a block form.

In Formulae (III-1) to (III-4), the positions of hydroxy group substitutions are not particularly restricted as long as they are on aromatic rings.

The plural $Ar^{31}$s to $Ar^{34}$s in each of Formulae (III-1) to (III-4) may all be the same atomic group, or may include two or more atomic groups. It is noted here that each of $Ar^{31}$ to $Ar^{34}$ independently represents either one of a group represented by Formula (III-a) and a group represented by Formula (III-b).

In Formulae (III-a) and (III-b), each of $R^{31}$ and $R^{34}$ independently represents a hydrogen atom or a hydroxy group and, from the standpoint of thermal conductivity of the cured product, $R^{31}$ and $R^{34}$ are preferably hydroxy groups. The positions of substitutions with $R^{31}$ and $R^{34}$ are not particularly restricted.

In Formula (III-a), each of $R^{32}$ and $R^{33}$ independently represents a hydrogen atom or an alkyl group having from 1 to 8 carbon atoms. Examples of the alkyl group having from 1 to 8 carbon atoms that is represented by $R^{32}$ and $R^{33}$ include a methyl group, an ethyl group, an n-propyl group, an n-butyl group, an isopropyl group, an isobutyl group, a t-butyl group, a pentyl group, a hexyl group, a heptyl group, and an octyl group. The positions of the substitutions with $R^{32}$ and $R^{33}$ in Formula (III-a) are not particularly restricted.

From the standpoint of achieving excellent thermal conductivity of the cured product, each of $Ar^{31}$ to $Ar^{34}$ in Formulae (III-1) and (III-4) independently is preferably at least one selected from a group derived from dihydroxybenzene (i.e., a group represented by Formula (III-a) wherein $R^{31}$ is a hydroxy group, and $R^{32}$ and $R^{33}$ are hydrogen atoms) and a group derived from dihydroxynaphthalene (i.e., a group represented by Formula (III-b) wherein $R^{34}$ is a hydroxy group).

The term "group derived from dihydroxybenzene" used herein means a divalent group formed by removing two hydrogen atoms from the aromatic ring moiety of dihydroxybenzene, and the positions from which two hydrogen atoms are removed are not particularly restricted. The terms "group derived from dihydroxynaphthalene" and the like used herein also have comparable meanings.

From the standpoints of the productivity and the fluidity of the epoxy resin composition, each of $Ar^{31}$ to $Ar^{34}$ independently is preferably a group derived from dihydroxybenzene, more preferably at least one selected from the group consisting of a group derived from 1,2-dihydroxybenzene (catechol) and a group derived from 1,3-dihydroxybenzene (resorcinol). From the standpoint of particularly improving the thermal conductivity of the cured product, it is preferred that $Ar^{31}$ to $Ar^{34}$ contain at least a group derived from resorcinol.

Further, from the standpoint of particularly improving the thermal conductivity of the cured product, the structural units, the numbers of which are represented by n31 to n34, each preferably contain at least a partial structure derived from resorcinol.

When the phenol novolac resin contains a partial structure derived from resorcinol, the content ratio of the partial structure derived from resorcinol in the total mass of the compound having a structure represented by at least one of Formulae (III-1) to (III-4) is preferably not lower than 55% by mass. From the standpoints of the Tg and the linear expansion coefficient of the cured product, the content ratio of the partial structure derived from resorcinol is more preferably not lower than 60% by mass, still more preferably not lower than 80% by mass and, from the standpoint of the thermal conductivity of the cured product, it is particularly preferably not lower than 90% by mass.

With regard to from m31 to m34 and from n31 to n34 in Formulae (III-1) to (III-4), from the standpoint of the fluidity of the epoxy resin composition, the value of m/n is preferably from 1/5 to 20/1, more preferably from 5/1 to 20/1, still more preferably from 10/1 to 20/1. Further, from the standpoint of the fluidity of the epoxy resin composition, the value of (m+n) is preferably not greater than 20, more preferably not greater than 15, still more preferably not greater than 10. The lower limit value of (m+n) is not particularly restricted. It is noted here that, when n is n31, m is m31; when n is n32, m is m32; when n is n33, m is m33; and when n is n34, m is m34.

Particularly, when $Ar^{31}$ to $Ar^{34}$ are each at least one of substituted or unsubstituted dihydroxybenzene and substituted or unsubstituted dihydroxynaphthalene, as compared to novolac resins and the like that are obtained by simple conversion of these compounds into novolac, a phenol novolac resin having a structure represented by at least one selected from the group consisting of Formulae (III-1) to (III-4) can be easily synthesized, and the resulting novolac resin tends to have a low softening point. Accordingly, there is an advantage that an epoxy resin composition containing such a novolac resin as a curing agent is easily produced and handled.

Whether or not a phenol novolac resin has a partial structure represented by at least one of Formulae (III-1) to (III-4) can be determined by field-desorption ionization mass spectrometry (FD-MS) based on whether or not the novolac resin contains, as a fragment component, a component corresponding to the partial structure represented by at least one of Formulae (III-1) to (III-4).

The molecular weight of the phenol novolac resin is not particularly restricted. From the standpoint of the fluidity of the epoxy resin composition, the number-average molecular weight (Mn) is preferably 2,000 or less, more preferably 1,500 or less, still more preferably from 350 to 1,500. Further, the weight-average molecular weight (Mw) is preferably 2,000 or less, more preferably 1,500 or less, still more preferably from 400 to 1,500.

The Mn and the Mw are measured by an ordinary method using GPC.

The hydroxy equivalent of the phenol novolac resin is not particularly restricted. From the standpoint of the crosslinking density that relates to the heat resistance of the cured product, the average hydroxy equivalent is preferably from 50 g/eq to 150 g/eq, more preferably from 50 g/eq to 120 g/eq, still more preferably from 55 g/eq to 120 g/eq.

The curing agent may also contain a monomer that is a low-molecular-weight phenol compound constituting the phenol novolac resin. The content ratio of the monomer that is a low-molecular-weight phenol compound constituting the phenol novolac resin in the curing agent (hereinafter, also referred to as "monomer content ratio") is not particularly restricted. From the standpoints of the thermal conductivity and the heat resistance of the cured product as well as the moldability of the epoxy resin composition, the monomer content ratio in the curing agent is preferably from 5% by mass to 80% by mass, more preferably from 15% by mass to 60% by mass, still more preferably from 20% by mass to 50% by mass.

When the monomer content ratio is 80% by mass or lower, since the amount of the monomer not contributing to crosslinking during a curing reaction is small and the amount of a high-molecular-weight material to be crosslinked is large, a higher-order structure having a higher density is formed, so that the thermal conductivity of the cured product tends to be improved. Meanwhile, when the monomer content ratio is 5% by mass or higher, since the epoxy resin composition easily flows during molding, its adhesion with a filler is further improved, so that the resulting cured product tends to attain superior thermal conductivity and heat resistance.

The amount of the curing agent to be contained in the epoxy resin composition is not particularly restricted. The ratio between the active hydrogen equivalents of the phenolic hydroxy groups in the curing agent (the number of equivalents of phenolic hydroxy groups) and the number of equivalents of the epoxy groups in the epoxy resin (the number of equivalents of phenolic hydroxy groups/the number of equivalents of epoxy groups) is preferably from 0.5 to 2, more preferably from 0.8 to 1.2.

The epoxy resin composition may further contain a curing catalyst as required. By incorporating a curing catalyst, the epoxy resin composition can be cured more sufficiently. The type and the content ratio of the curing catalyst are not particularly restricted and can be selected as appropriate from the standpoints of the reaction rate, the reaction temperature, the storage property and the like. Specific examples of the curing catalyst include imidazole compounds, organic phosphorus compounds, tertiary amines, and quaternary ammonium salts. These curing catalysts may be used singly, or in combination of two or more kinds thereof.

Thereamong, from the standpoint of the heat resistance of the cured product, the curing catalyst is preferably at least one selected from the group consisting of: organic phosphine compounds; compounds having intramolecular polarization that are obtained by adding a π bond-containing compound, such as maleic anhydride, a quinone compound (e.g., 1,4-benzoquinone, 2,5-toluquionone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, or phenyl-1,4-benzoquinone), diazophenylmethane or a phenol resin, to an organic phosphine compound; and complexes formed by an organic phosphine compound and an organic boron compound (e.g., tetraphenyl borate, tetra-p-tolyl borate, or tetra-n-butyl borate).

Specific examples of the organic phosphine compounds include triphenyl phosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl) phosphine, tris(dialkoxyphenyl)phosphine, tris(trialkoxyphenyl)phosphine, tris(tetraalkoxyphenyl)phosphine, trialkyl phosphine, dialkylaryl phosphine, and alkyldiaryl phosphine.

These curing catalysts may be used singly, or in combination of two or more kinds thereof. As a method of efficiently preparing the below-described B-stage sheet, C-stage sheet and cured product, for example, a method which uses a mixture of two curing catalysts having different initiation temperatures and rates for the reaction between the epoxy resin and the curing agent may be employed.

When two or more curing catalysts are used in combination, their mixing ratio is not particularly restricted and can be decided in accordance with the properties desired for the resulting B-stage sheet, C-stage sheet and cured product.

When the epoxy resin composition contains a curing catalyst, from the standpoint of the moldability of the epoxy resin composition, the content ratio of the curing catalyst(s) is preferably from 0.1% by mass to 1.5% by mass, more preferably from 0.2% by mass to 1.0% by mass, still more preferably from 0.3% by mass to 1.0% by mass, with respect to the total mass of the epoxy resin and the curing agent.

As the curing agent(s), in addition to the above-described phenolic curing agents, amine-based curing agents can be used as well. Amine-based curing agents are advantageous in that they allow the cured product to have higher heat resistance and superior adhesion with a metal as compared to a case where a phenolic curing agent is used. Amine-based curing agents assume a liquid or solid form depending on the molecular structure and, generally, liquid amines are readily miscible with the epoxy resin and thus have a problem in having a short life; on the other hand, solid amines advantageously have a long life since they allow the epoxy resin to have a high melting point and increases the reaction initiation temperature even when mixed with the epoxy resin.

Specific examples of the amine-based curing agents include 4,4'-diaminodiphenylmethane, 4,4'-diaminodiphenyl ether, 4,4'-diaminodiphenylsulfone, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, and 1,8-diaminonaphthalene, among which 4,4'-diaminodiphenylsulfone is preferred from the standpoint of the heat resistance of the cured product.

The epoxy resin composition containing an amine-based curing agent such as 4,4'-diaminodiphenylsulfone yields a cured product having excellent heat resistance. Thus, the epoxy resin composition is preferred as a binder of a carbon fiber-reinforced plastic (CFRP) and the like, and is therefore suitable for automotive applications, aircraft applications and the like.

The epoxy resin composition may also contain a mold release agent. Examples of the mold release agent include oxidized or non-oxidized polyolefins, carnauba wax, montanoic acid esters, montanoic acid, and stearic acid. These release agents may be used singly, or in combination of two or more kinds thereof.

The epoxy resin composition may further contain, for example, a stress reliever and a reinforcing material. Examples of the stress reliever include silicone oil and silicone powder. Examples of the reinforcing material include glass fibers.

The epoxy resin composition, when made into a cured product, preferably has a diffraction peak in a diffraction angle (2θ) range of from 3.0° to 3.5° as determined by X-ray diffractometry using CuKα radiation. In the cured product having such a diffraction peak, a smectic structure with a particularly high order among higher-order structures is formed; therefore, the cured product tends to have excellent thermal conductivity.

The epoxy resin composition, when made into a cured product, has a glass transition temperature of preferably 180° C. or higher, more preferably 185° C. or higher, still more preferably 190° C. or higher.

The glass transition temperature can be measured by the method described below in the section of Examples.

A method of preparing the epoxy resin composition is not particularly restricted as long as it is capable of dispersing and mixing various components. Examples of such a method include a method in which various components each in a prescribed amount are thoroughly mixed using a mixer or the like and subsequently melt-kneaded using a mixing roll, an extruder or the like, followed by cooling and pulverization of the resultant; and a method in which the above-described various components are stirred and mixed, and the resultant is kneaded, cooled, pulverized and the like using a kneader, a roll, an extruder or the like that has been heated in advance to a temperature of from 70° C. to 140° C.

Further, the epoxy resin composition may be made into a tablet having dimensions and mass that conform to the molding conditions.

The epoxy resin composition can be used in the fields of motors and inverters and the like for industrial and automobile use, as well as printed wiring boards, semiconductor element sealants and the like.

By applying the epoxy resin composition to power devices for automobiles and industrial equipments, the heat generation in the devices can be suppressed and the output, the service life and the like of the devices can be improved, which contribute to energy saving.

<Resin Sheet>

The resin sheet of the disclosure includes a resin composition layer containing the epoxy resin composition of the disclosure. The resin composition layer may constitute a single layer, or two or more layers. The resin sheet of the disclosure may be configured to further include a mold release film on the resin composition layer as required.

The resin sheet can be produced by, for example, applying a varnish-form epoxy resin composition (hereinafter, also referred to as "resin varnish"), which is prepared by adding an organic solvent such as methyl ethyl ketone or cyclohexanone to the epoxy resin composition, onto a mold release film such as a PET film, and subsequently drying the resultant.

The resin sheet of the disclosure may be used as, for example, an adhesive sheet.

The application of the resin varnish can be performed by any known method. Specific examples thereof include a comma coating method, a die coating method, a lip coating method, and a gravure coating method. As a resin varnish application method for forming a resin composition layer at a prescribed thickness, for example, a comma coating method where a material to be coated is passed between gaps, or a die coating method where the resin varnish is applied from a nozzle at an adjusted flow rate may be employed. For example, when the pre-drying thickness of the resin composition layer is from 50 µm to 500 µm, it is preferred to employ a comma coating method.

A drying method is not particularly restricted as long as the organic solvent contained in the resin varnish can be removed at least partially, and the drying method can be selected as appropriate from those that are normally employed.

The density of the resin sheet is not particularly restricted and may be, for example, from 3.0 g/cm³ to 3.4 g/cm³. Considering satisfaction of both flexibility and thermal conductivity, the density of the resin sheet is preferably from 3.0 g/cm³ to 3.3 g/cm³, more preferably from 3.1 g/cm³ to 3.3 g/cm³. The density of the resin sheet can be adjusted by, for example, changing the amount of an inorganic filler to be added.

The term "density of the resin sheet" used herein refers to the density of the resin composition layer and, when the resin sheet includes two or more resin composition layers, the term refers to an average density value of all of the resin composition layers. Further, when the resin sheet includes a mold release film, the term refers to the density of the resin composition layer(s) excluding the mold release film.

The resin sheet preferably includes: a first resin composition layer containing the epoxy resin composition; and a second resin composition layer which contains the epoxy resin composition and is disposed on the first resin composition layer. For example, the resin sheet is preferably a layered body constituted by the first resin composition layer formed from the epoxy resin composition and the second resin composition layer formed from the epoxy resin composition. By this, the withstand voltage can be further improved. The epoxy resin composition forming the first resin composition layer and the epoxy resin composition forming the second resin composition layer may have the same formulation, or have different formulations from each other. From the standpoint of the thermal conductivity, it is preferred that the epoxy resin composition forming the first resin composition layer and the epoxy resin composition forming the second resin composition layer have the same formulation.

When the resin sheet is a layered body, the layered body is preferably produced by superimposing the first and the second resin composition layers formed from the epoxy resin composition with each other. By adopting this configuration, the withstand voltage tends to be further improved.

This can be considered, for example, as follows. That is, by superimposing the two resin composition layers, parts having a small thickness (pin-holes or voids) that can exist in one of the resin composition layers are compensated by the other resin composition layer. It is believed that this can increase the minimum insulation thickness and the withstand voltage is thereby further improved. The probability of pin-hole or void generation in such a resin sheet production method is not high; however, since the probability of thin parts to overlap with each other is squared by superimposing the two resin composition layers, the number of pin-holes or voids approaches to 0. Dielectric breakdown occurs at a part of the weakest insulation; therefore, it is believed that an effect of further improving the withstand voltage can be obtained by superimposing the two resin composition layers. In addition, by superimposing the two resin composition layers, it is believed that the contact probability of filler molecules is also improved and a thermal conductivity-improving effect is exerted as well.

A method of producing the resin sheet preferably includes: the step of obtaining a layered body by superimposing the second resin composition layer formed from the epoxy resin composition on the first resin composition layer formed from the epoxy resin composition; and the step of performing a hot press treatment of the thus obtained layered body. By employing such a production method, the withstand voltage tends to be further improved.

The thickness of the resin sheet can be selected as appropriate in accordance with the intended purpose. For example, the thickness of the resin composition layer(s) can be from 50 µm to 350 µm and, from the standpoints of the thermal conductivity, the electrical insulation and the sheet flexibility, it is preferably from 60 µm to 300 µm.

<B-Stage Sheet>

The B-stage sheet of the disclosure includes a semi-cured resin composition layer containing a semi-cured product of the epoxy resin composition of the disclosure.

The B-stage sheet can be produced by, for example, a production method including the step of heat-treating a resin sheet into a B-stage state.

Since the B-stage sheet is formed by a heat treatment of a resin sheet, the B-stage sheet has excellent thermal conductivity as well as excellent flexibility and working life.

With regard to the B stage and the C stage described below, reference should be made to the provisions of JIS K6900:1994.

The B-stage sheet has a viscosity of from $10^4$ Pa·s to $10^5$ Pa·s at normal temperature (25° C.); however, the viscosity is preferably reduced to be from $10^2$ Pa·s to $10^3$ Pa·s at 100° C. Further, the below-described cured resin composition layer is not melted even by heating. The viscosity is determined by dynamic viscoelasticity measurement (frequency: 1 Hz, load: 40 g, heating rate: 3° C./min).

Since a curing reaction hardly proceeds in a resin composition layer of a resin sheet, the layer has some flexibility but is poorly flexible as a sheet, and the sheet has poor self-supportability with its support such as a PET film being removed, which makes it difficult to handle the sheet in some cases. Therefore, it is preferred that the resin composition layer be B-staged by the following heat treatment.

The conditions for heat-treating the resin sheet are not particularly restricted as long as the resin composition layer can be semi-cured to a B-stage state, and the conditions can be selected as appropriate in accordance with the constitution of the epoxy resin composition. For the heat treatment, a heat treatment method selected from vacuum hot pressing and hot roll lamination is preferably employed for the purpose of eliminating gaps (voids) generated in the resin composition layer at the time of applying the epoxy resin composition. This enables to efficiently produce a flat B-stage sheet.

Specifically, for example, the resin composition layer can be semi-cured into a B-stage state by performing a hot press treatment thereof at a heating temperature of from 80° C. to 180° C. for a period of from 1 second to 3 minutes under reduced pressure (e.g., 1 kPa). The pressing pressure can be from 5 MPa to 20 MPa.

The thickness of the B-stage sheet can be selected as appropriate in accordance with the intended purpose. The thickness of the B-stage sheet may be, for example, from 50 μm to 350 μm, and it is preferably from 60 μm to 300 μm from the standpoints of thermal conductivity, electrical insulation and sheet flexibility. Further, the B-stage sheet can also be produced by hot-pressing two or more resin sheets in a layered state.

<C-Stage Sheet>

The C-stage sheet of the disclosure includes a cured resin composition layer containing a cured product of the epoxy resin composition of the disclosure.

The C-stage sheet can be produced by, for example, a production method including the step of heat-treating a resin sheet or the B-stage sheet into a C-stage state.

The conditions for heat-treating the resin sheet or the B-stage sheet are not particularly restricted as long as a resin composition layer or a semi-cured resin composition layer can be cured to a C-stage state, and the conditions can be selected as appropriate in accordance with the constitution of the epoxy resin composition. For the heat treatment, a heat-treatment method such as vacuum hot pressing is preferably employed from the standpoints of suppressing the void generation in the resulting C-stage sheet and improving the voltage resistance of the C-stage sheet. This enables to efficiently produce a flat C-stage sheet.

Specifically, for example, the resin composition layer or the semi-cured resin composition layer can be cured into a C-stage state by performing a hot press treatment thereof at a heating temperature of from 150° C. to 220° C. for a period of from 1 minute to 30 minutes with a pressure of from 1 MPa to 20 MPa.

The thickness of the C-stage sheet can be selected as appropriate in accordance with the intended purpose. The thickness of the C-stage sheet may be, for example, from 50 μm to 350 μm, and it is preferably from 60 μm to 300 μm from the standpoints of thermal conductivity, electrical insulation and sheet flexibility. Further, the C-stage sheet can also be produced by hot-pressing two or more resin sheets or B-stage sheets in a layered state.

The C-stage sheet preferably has a diffraction peak in a diffraction angle (2θ) range of from 3.0° to 3.5° as determined by X-ray diffractometry using CuKα radiation. In the C-stage sheet having such a diffraction peak, a smectic structure with a particularly high order among higher-order structures is formed; therefore, the C-stage sheet tends to have excellent thermal conductivity.

<Cured Product>

The cured product of the disclosure is a cured product of the epoxy resin composition of the disclosure. A method of curing the epoxy resin composition is not particularly restricted, and any commonly used method can be selected as appropriate. For example, a cured product of the epoxy resin composition can be obtained by heat-treating the epoxy resin composition.

A method of heat-treating the epoxy resin composition is not particularly restricted, and the heating conditions are also not particularly restricted. The temperature range of the heat treatment can be selected as appropriate in accordance with the types of the epoxy resin and the curing agent that constitute the epoxy resin composition. Further, the duration of the heat treatment is not particularly restricted and can be selected as appropriate in accordance with the shape, the thickness and the like of the resulting cured product.

A cured product can be obtained by, for example, press-molding the epoxy resin composition. Examples of a method of performing the press-molding include transfer molding methods and compression molding methods, among which a transfer molding is generally employed. For example, in a transfer molding method, a cured product can be obtained by heating the epoxy resin composition for a period of from 30 seconds to 600 seconds at a molding temperature of from 140° C. to 180° C. and a molding pressure of from 10 MPa to 25 MPa. If necessary, the cured product removed from the mold may be post-cured by further heating at a temperature of from 160° C. to 200° C. for 2 hours to 8 hours.

The cured product preferably has a diffraction peak in a diffraction angle (2θ) range of from 3.0° to 3.5° as determined by X-ray diffractometry using CuKα radiation. In the cured product having such a diffraction peak, a smectic structure with a particularly high order among higher-order structures is formed; therefore, the cured product tends to have excellent thermal conductivity.

The cured product has a glass transition temperature of preferably 180° C. or higher, more preferably 185° C. or higher, still more preferably 190° C. or higher.

The glass transition temperature can be measured by the method described below in the section of Examples.

<Metal Foil with Resin>

The metal foil with a resin of the disclosure includes: a metal foil; and a semi-cured resin composition layer containing a semi-cured product of the epoxy resin composition of the disclosure, which layer is arranged on the metal foil. By including the semi-cured resin composition layer containing a semi-cured product of the epoxy resin composition of the disclosure, the metal foil with a resin of the disclosure has excellent thermal conductivity and electrical insulation.

The semi-cured resin composition layer can be obtained by heat-treating the epoxy resin composition into a B-stage state.

Examples of the metal foil include a gold foil, a copper foil and an aluminum foil, and a copper foil is generally used.

The thickness of the metal foil is not particularly restricted as long as it is within a range of from 1 μm to 35

μm. By using a metal foil of 20 μm or thinner, the flexibility of the metal foil with a resin tends to be further improved.

As the metal foil, a composite foil having a three-layer structure in which an intermediate layer is formed by nickel, a nickel-phosphorus alloy, a nickel-tin alloy, a nickel-iron alloy, lead, a lead-tin alloy or the like and a copper layer of from 0.5 μm to 15 μm and a copper layer of from 10 μm to 300 μm are disposed on the respective surfaces of the intermediate layer, or a composite foil having a two-layer structure in which an aluminum foil and a copper foil are combined, can be used as well.

The metal foil with a resin can be produced by, for example, applying and drying an epoxy resin composition (preferably a resin varnish) on a metal foil to form a resin composition layer (resin sheet) and subsequently heat-treating the thus formed resin composition layer into a B-stage state. A method of forming the resin composition layer is as described above.

The production conditions of the metal foil with a resin are not particularly restricted. In the dried resin composition layer, it is preferred that at least 80% by mass of the organic solvent used in the resin varnish has been volatilized. The drying temperature is from 80° C. to 180° C. or so, and the drying time is not particularly restricted and can be selected as appropriate taking into consideration the gelation time of the resin varnish. As for the amount of the resin varnish to be applied, the resin varnish is applied such that the thickness of the dried resin composition layer is preferably from 50 μm to 350 μm, more preferably from 60 μm to 300 μm.

The dried resin composition layer is heat-treated and thereby brought into a B-stage state. The conditions for heat-treating the resin composition layer are the same as the heat treatment conditions of the B-stage sheet.

<Metal Substrate>

The metal substrate of the disclosure includes: a metal support; a cured resin composition layer which is arranged on the metal support and contains a cured product of the epoxy resin composition of the disclosure; and a metal foil arranged on the cured resin composition layer.

By arranging the cured resin composition layer which contains a cured product of the epoxy resin composition of the disclosure between the metal support and the metal foil, the adhesion, the thermal conductivity and the electrical insulation are improved.

The material, the thickness and the like of the metal support are selected as appropriate in accordance with the intended purpose. Specifically, a metal such as aluminum or iron may be used, and the thickness can be set at from 0.5 mm to 5 mm.

The metal foil arranged on the cured resin composition layer have the same meanings as in the above-described metal foil with a resin, and preferred modes thereof are also the same.

The metal substrate of the disclosure can be produced by, for example, as follows.

A resin composition layer is formed by applying and drying the epoxy resin composition onto a metal support made of aluminum or the like in the same manner as in the case of applying the epoxy resin composition onto the metal foil with a resin or the like, and a metal foil is arranged on the thus formed resin composition layer, after which the resultant is heated and pressed to cure the resin composition layer, whereby the metal substrate can be produced. Alternatively, the metal substrate of the disclosure can also be produced by pasting the metal foil with a resin onto a metal support such that the semi-cured resin composition layer faces the metal support, and subsequently heating and pressing the resultant and thereby curing the semi-cured resin composition layer.

EXAMPLES

The invention will now be described more concretely by way of Examples thereof; however, the invention is not restricted to the below-described Examples. It is noted here that, unless otherwise specified, "%" is based on mass.

The materials used for the synthesis of epoxy polymer-containing epoxy resins and abbreviations of the materials are shown below.

Epoxy Compound 1

Compound name: trans-4-{4-(2,3-epoxypropoxy)phenyl}cyclohexyl=4-(2,3-epoxypropoxy)benzoate, epoxy equivalent: 212 g/eq, produced by the method described in JP-A No. 2011-74366

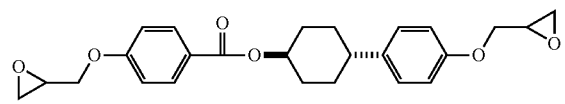

Phenol Compound 1

Compound name: 1,2,3-trihydroxybenzene (manufactured by Wako Pure Chemical Industries, Ltd., molecular weight: 126.11, hydroxy equivalent: 42 g/eq.)

Phenol Compound 2

Compound name: 1,2,4-trihydroxybenzene (manufactured by Wako Pure Chemical Industries, Ltd., molecular weight: 126.11, hydroxy equivalent: 42 g/eq.)

Phenol Compound 3

Compound name: 1,3,5-trihydroxybenzene (manufactured by Wako Pure Chemical Industries, Ltd., molecular weight: 126.11, hydroxy equivalent: 42 g/eq.)

Phenol Compound 4

Compound name: hydroquinone (manufactured by Wako Pure Chemical Industries, Ltd., hydroxy equivalent: 55 g/eq.)

Solvent 1

Cyclohexanone (boiling point: 156° C.)

Curing Catalyst 1

Triphenyl phosphine (manufactured by Hokko Chemical Industry Co., Ltd., molecular weight: 262)

Example 1

[Synthesis of Epoxy Resin 1]

First, 50 g (0.118 mol) of the epoxy compound 1 was weighed in a 500-mL three-necked flask, and 80 g of the solvent 1 (cyclohexanone) was added thereto. A condenser and a nitrogen-introducing tube were attached to the three-necked flask, and a stirring blade was installed in such a manner to be submerged in the solvent. This three-necked flask was immersed in a 160° C. oil bath, and stirring was initiated. After confirming several minutes later that the epoxy compound 1 had been dissolved and a transparent solution was formed, 0.99 g (0.00785 mol) of the phenol compound 1 (1,2,3-trihydroxybenzene) was added to the flask, and 0.5 g of the curing catalyst 1 (triphenyl phosphine) was further added, after which the flask was continuously heated at an oil bath temperature of 160° C. In this process, the ratio (Ep/Ph) between the number of equivalents of epoxy groups (Ep) in the epoxy compound 1 and the number of equivalents of phenolic hydroxy groups (Ph) in the phenol compound 1 was set at 10/1. After 5 hours of continuous heating, cyclohexanone was removed from the reaction solution by distillation under reduced pressure, and the resulting residue was cooled to room temperature, whereby an epoxy polymer-containing epoxy resin 1 was obtained. It is noted here that this epoxy resin 1 contained a portion of the synthesis solvent and an unreacted epoxy compound.

The solid content of the epoxy resin 1 was measured to be 98.2% by a heat-loss method. The solid content was calculated by the following formula based on the amount of epoxy resin 1, which was measured after the epoxy resin 1 was weighed at an amount of from 1.0 g to 1.1 g in an aluminum cup and then left to stand for 30 minutes in a dryer set at a temperature of 180° C., and the amount of the epoxy resin 1 before this heating.

Solid content (%)=(Weight measured after being left to stand for 30 minutes/Weight measured before heating)×100

In addition, when the number-average molecular weight of the epoxy resin 1 was measured by gel permeation chromatography (GPC), the number-average molecular weight of the epoxy polymer generated by the synthesis and that of the epoxy resin containing an unreacted epoxy compound and the epoxy polymer were found to be 1,500 and 620, respectively.

Moreover, the epoxy equivalent of the epoxy resin 1 was measured to be 263 g/eq by a perchloric acid titration method.

When the melting point of the epoxy resin 1 was measured by differential scanning calorimetry (DSC), the epoxy resin 1 was found to have an endothermic peak at 130° C.

[Preparation and Molding of Molding Material]

The below-described components were roll-kneaded at a kneading temperature of from 60° C. to 90° C. for a kneading time of 10 minutes, and the resultant was subsequently cooled and pulverized to prepare a molding material of an epoxy resin composition. The content ratio of the inorganic fillers in the thus obtained molding material was 78% by volume.

(Epoxy Resin)
Epoxy resin 1: 100.00 g
(Inorganic Fillers)
Alumina filler (AL35-63, manufactured by Nippon Steel & Sumikin Materials Co., Ltd., Micron Co., average particle size: 50 μm): 1,053.4 g
Alumina filler (AL35-45, manufactured by Nippon Steel & Sumikin Materials Co., Ltd., Micron Co., average particle size: 20 μm): 301.0 g
Alumina filler (AX3-32, manufactured by Nippon Steel & Sumikin Materials Co., Ltd., Micron Co., average particle size: 4 μm): 301.0 g
(Phenolic Curing Agent)
Phenol-novolac curing agent (A-4SM, manufactured by Hitachi Chemical Co., Ltd.): 24.10 g
(Curing Catalyst)
An addition reaction product of p-benzoquinone and tri-n-butyl phosphine: 1.50 g
(Silane Coupling Agent)
3-phenylaminopropyltrimethoxysilane (KBM-573, manufactured by Shin-Etsu Chemical Co., Ltd.): 1.16 g
(Release Agent)
Montanoic acid ester (LICOWAX E, manufactured by Clariant Japan): 14.46 g Using a mold for spiral flow measurement according to EMMI-1-66, the above-prepared molding material was molded by a transfer molding machine under the conditions of a mold temperature of 160° C., a molding pressure of 7.0 MPa, and a curing time of 300 seconds, and the flow distance was determined. As a result, the flow distance was found to be 60 cm.

Further, a mold-shaped cured product was obtained by transfer-molding the above-prepared molding material under the conditions of a mold temperature of 160° C., a molding pressure of 7.0 MPa, and a curing time of 300 seconds. The cured product obtained after the transfer molding was further heated at 180° C. for 4 hours and thereby post-cured.

The cured product had a specific gravity of 3.25 as determined by Archimedes method, and a glass transition temperature of 192° C. as determined by dynamic viscoelasticity analysis (DMA).

It is noted here that the glass transition temperature of the cured product is determined by a dynamic viscoelasticity analysis in a tensile mode. With regard to the measurement conditions, the frequency, the heating rate and the strain are set at 10 Hz, 5° C./min and 0.1%, respectively, and a peak in the thus obtained tan δ chart is defined as the glass transition temperature. As a measurement apparatus, for example, RSA-G2 manufactured by TA Instruments Inc. can be used.

The thermal diffusivity of the cured product was measured by a laser flash method using a thermal diffusivity analyzer (LFA447 manufactured by NETZSCH Japan K.K.). From the product of the thus obtained thermal diffusivity value and the separately-measured specific heat and specific gravity values of the cured product, the thermal conductivity of the cured product was determined. As a result, the cured product was found to have a thermal conductivity of 11.6 W/(m·K).

Moreover, when the cured product was analyzed by X-ray diffractometry using CuKα radiation, the cured product did not have any diffraction peak in a diffraction angle (2θ) range of from 3.0° to 3.5°, and it was thus presumed that the cured product formed a nematic phase.

Example 2

[Synthesis of Epoxy Resin 2]

An epoxy polymer-containing epoxy resin 2 was obtained in the same manner as in Example 1, except that the phenol compound 1 was changed to the phenol compound 2 (1,2,4-trihydroxybenzene). It is noted here that the thus obtained epoxy resin 2 contained a portion of the synthesis solvent and an unreacted epoxy compound.

For this epoxy resin 2, the solid content, the number-average molecular weight, the epoxy equivalent, and the melting point were measured in the same manner as in Example 1.

The results thereof are shown in Table 1.

[Preparation and Molding of Molding Material]

A molding material of an epoxy resin composition was prepared in the same manner as in Example 1, except that the epoxy resin 1 was changed to the epoxy resin 2. The content ratio of the inorganic fillers in the thus obtained molding material was 78% by volume.

In the same manner as in Example 1, the flow distance, the specific gravity and the glass transition temperature of this molding material were measured, and the thermal conductivity was determined and X-ray diffractometry using CuKα radiation was performed for a cured product of the molding material.

The results thereof are shown in Table 1.

The cured product of Example 2 did not have any diffraction peak in a diffraction angle (2θ) range of from 3.0° to 3.5°, and it was thus presumed that this cured product formed a nematic phase.

Example 3

[Synthesis of Epoxy Resin 3]

An epoxy polymer-containing epoxy resin 3 was obtained in the same manner as in Example 1, except that the phenol compound 1 was changed to the phenol compound 3 (1,3,5-trihydroxybenzene). It is noted here that the thus obtained epoxy resin 3 contained a portion of the synthesis solvent and an unreacted epoxy compound.

For this epoxy resin 3, the solid content, the number-average molecular weight, the epoxy equivalent, and the melting point were measured in the same manner as in Example 1.

The results thereof are shown in Table 1.

[Preparation and Molding of Molding Material]

A molding material of an epoxy resin composition was prepared in the same manner as in Example 1, except that the epoxy resin 1 was changed to the epoxy resin 3. The content ratio of the inorganic fillers in the thus obtained molding material was 78% by volume.

In the same manner as in Example 1, the flow distance, the specific gravity and the glass transition temperature of this molding material were measured, and the thermal conductivity was determined and X-ray diffractometry using CuKα radiation was performed for a cured product of the molding material.

The results thereof are shown in Table 1.

The cured product of Example 3 did not have any diffraction peak in a diffraction angle (2θ) range of from 3.0° to 3.5°, and it was thus presumed that this cured product formed a nematic phase.

Example 4

[Synthesis of Epoxy Resin 4]

An epoxy polymer-containing epoxy resin 4 was obtained in the same manner as in Example 1, except that 1.98 g (0.0157 mol) of the phenol compound 1 (1,2,3-trihydroxybenzene) was added to the flask instead of adding 0.99 g (0.00785 mol) of the phenol compound 1 (1,2,3-trihydroxybenzene) to the flask. In this process, the ratio (Ep/Ph) between the number of equivalents of epoxy groups (Ep) in the epoxy compound 1 and the number of equivalents of phenolic hydroxy groups (Ph) in the phenol compound 1 was set at 5/1. It is noted here that the thus obtained epoxy resin 4 contained a portion of the synthesis solvent and an unreacted epoxy compound.

For this epoxy resin 4, the solid content, the number-average molecular weight, the epoxy equivalent, and the melting point were measured in the same manner as in Example 1.

The results thereof are shown in Table 1.

[Preparation and Molding of Molding Material]

A molding material of an epoxy resin composition was prepared in the same manner as in Example 1, except that the epoxy resin 1 was changed to the epoxy resin 4. The content ratio of the inorganic fillers in the thus obtained molding material was 78% by volume.

In the same manner as in Example 1, the flow distance, the specific gravity and the glass transition temperature of this molding material were measured, and the thermal conductivity was determined and X-ray diffractometry using CuKα radiation was performed for a cured product of the molding material.

The results thereof are shown in Table 1.

The cured product of Example 4 did not have any diffraction peak in a diffraction angle (2θ) range of from 3.0° to 3.5°, and it was thus presumed that this cured product formed a nematic phase.

Example 5

[Synthesis of Epoxy Resin 5]

An epoxy polymer-containing epoxy resin 5 was obtained in the same manner as in Example 2, except that 1.98 g (0.0157 mol) of the phenol compound 2 (1,2,4-trihydroxybenzene) was added to the flask instead of adding 0.99 g (0.00785 mol) of the phenol compound 2 (1,2,4-trihydroxybenzene) to the flask. In this process, the ratio (Ep/Ph) between the number of equivalents of epoxy groups (Ep) in the epoxy compound 1 and the number of equivalents of phenolic hydroxy groups (Ph) in the phenol compound 2 was set at 5/1. It is noted here that the thus obtained epoxy resin 5 contained a portion of the synthesis solvent and an unreacted epoxy compound.

For the epoxy resin 5, the solid content, the number-average molecular weight, the epoxy equivalent, and the melting point were measured in the same manner as in Example 1.

The results thereof are shown in Table 1.

[Preparation and Molding of Molding Material]

A molding material of an epoxy resin composition was prepared in the same manner as in Example 1, except that the epoxy resin 1 was changed to the epoxy resin 5. The content ratio of the inorganic fillers in the thus obtained molding material was 78% by volume.

In the same manner as in Example 1, the flow distance, the specific gravity and the glass transition temperature of this molding material were measured, and the thermal conductivity was determined and X-ray diffractometry using CuKα radiation was performed for a cured product of the molding material.

The results thereof are shown in Table 1.

It was found that the cured product of Example 5 had a diffraction peak in a diffraction angle (2θ) range of from 3.0° to 3.5° and formed a smectic phase.

Example 6

[Synthesis of Epoxy Resin 6]

An epoxy polymer-containing epoxy resin 6 was obtained in the same manner as in Example 3, except that 1.98 g (0.0157 mol) of the phenol compound 2 (1,3,5-trihydroxybenzene) was added to the flask instead of adding 0.99 g (0.00785 mol) of the phenol compound 3 (1,3,5-trihydroxybenzene) to the flask. In this process, the ratio (Ep/Ph) between the number of equivalents of epoxy groups (Ep) in the epoxy compound 1 and the number of equivalents of phenolic hydroxy groups (Ph) in the phenol compound 3 was set at 5/1. It is noted here that the thus obtained epoxy resin 6 contained a portion of the synthesis solvent and an unreacted epoxy compound.

For the epoxy resin 6, the solid content, the number-average molecular weight, the epoxy equivalent, and the melting point were measured in the same manner as in Example 1.

The results thereof are shown in Table 1.

[Preparation and Molding of Molding Material]

A molding material of an epoxy resin composition was prepared in the same manner as in Example 1, except that the epoxy resin 1 was changed to the epoxy resin 6. The content ratio of the inorganic fillers in the thus obtained molding material was 78% by volume.

In the same manner as in Example 1, the flow distance, the specific gravity and the glass transition temperature of this molding material were measured, and the thermal conductivity was determined and X-ray diffractometry using CuKα radiation was performed for a cured product of the molding material.

The results thereof are shown in Table 1.

It was found that the cured product of Example 6 had a diffraction peak in a diffraction angle (2θ) range of from 3.0° to 3.5° and formed a smectic phase.

Comparative Example 1

[Synthesis of Epoxy Resin 7]

First, 50 g (0.118 mol) of the epoxy compound 1 was weighed in a 500-mL three-necked flask, and 80 g of the solvent 1 (cyclohexanone) was added thereto. A condenser and a nitrogen-introducing tube were attached to the three-necked flask, and a stirring blade was installed in such a manner to be submerged in the solvent. This three-necked flask was immersed in a 160° C. oil bath, and stirring was initiated. After confirming several minutes later that the epoxy compound 1 had been dissolved and a transparent solution was formed, 1.3 g (0.0118 mol) of the phenol compound 4 (hydroquinone) was added to the flask, and 0.5 g of the curing catalyst 1 (triphenyl phosphine) was further added, after which the flask was continuously heated at an oil bath temperature of 160° C. In this process, the ratio (Ep/Ph) between the number of equivalents of epoxy groups (Ep) in the epoxy compound 1 and the number of equivalents of phenolic hydroxy groups (Ph) in the phenol compound 4 was set at 10/1. After 5 hours of continuous heating, cyclohexanone was removed from the reaction solution by distillation under reduced pressure, and the resulting residue was cooled to room temperature, whereby an epoxy polymer-containing epoxy resin 7 was obtained. It is noted here that this epoxy resin 7 contained a portion of the synthesis solvent and an unreacted epoxy compound.

For the epoxy resin 7, the solid content, the number-average molecular weight, the epoxy equivalent, and the melting point were measured in the same manner as in Example 1.

The results thereof are shown in Table 1.

[Preparation and Molding of Molding Material]

A molding material of an epoxy resin composition was prepared in the same manner as in Example 1, except that the epoxy resin 1 was changed to the epoxy resin 7. The content ratio of the inorganic fillers in the thus obtained molding material was 78% by volume.

In the same manner as in Example 1, the flow distance, the specific gravity and the glass transition temperature of this molding material were measured, and the thermal conductivity was determined and X-ray diffractometry using CuKα radiation was performed for a cured product of the molding material.

The results thereof are shown in Table 1.

It was found that the cured product of Comparative Example 1 had a diffraction peak in a diffraction angle (2θ) range of from 3.0° to 3.5° and formed a smectic phase.

Comparative Example 2

[Synthesis of Epoxy Resin 8]

An epoxy polymer-containing epoxy resin 8 was obtained in the same manner as in Comparative Example 1, except that 2.6 g (0.0236 mol) of the phenol compound 4 (hydroquinone) was added to the flask instead of adding 1.3 g (0.0118 mol) of the phenol compound 4 (hydroquinone) to the flask. In this process, the ratio (Ep/Ph) between the number of equivalents of epoxy groups (Ep) in the epoxy compound 1 and the number of equivalents of phenolic hydroxy groups (Ph) in the phenol compound 4 was set at 5/1. It is noted here that the thus obtained epoxy resin 8 contained a portion of the synthesis solvent and an unreacted epoxy compound.

For the epoxy resin 8, the solid content, the number-average molecular weight, the epoxy equivalent, and the melting point were measured in the same manner as in Example 1.

The results thereof are shown in Table 1.

[Preparation and Molding of Molding Material]

A molding material of an epoxy resin composition was prepared in the same manner as in Example 1, except that the epoxy resin 1 was changed to the epoxy resin 8. The content ratio of the inorganic fillers in the thus obtained molding material was 78% by volume.

In the same manner as in Example 1, the flow distance, the specific gravity and the glass transition temperature of this molding material were measured, and the thermal conductivity was determined and X-ray diffractometry using CuKα radiation was performed for a cured product of the molding material.

The results thereof are shown in Table 1.

The cured product of Comparative Example 2 did not have any diffraction peak in a diffraction angle (2θ) range of from 3.0° to 3.5°, and it was thus presumed that this cured product formed a nematic phase.

The formulations and the conditions for the synthesis of the epoxy resins 1 to 8 as well as the properties of the epoxy resins 1 to 8 and the molding materials obtained using the epoxy resins 1 to 8 are shown in Table 1 below.

In Table 1, the numerical values in the rows of [Synthesis formulations] indicate the amounts (g) of the respective components, and "-" means that the corresponding component was not used.

TABLE 1

| Item | | Example 1 | Example 2 | Example 3 | Example 4 | Example 5 | Example 6 | Comparative Example 1 | Comparative Example 2 |
|---|---|---|---|---|---|---|---|---|---|
| Synthesis formulations | Ep/Ph | | | 10/1 | | 5/1 | | 10/1 | 5/1 |
| | Epoxy compound 1 | 50 | 50 | 50 | 50 | 50 | 50 | 50 | 50 |
| | Phenol compound 1  1,2,3-trihydroxybenzene | 0.99 | — | — | 1.98 | — | — | — | — |
| | Phenol compound 2  1,2,4-trihydroxybenzene | — | 0.99 | — | — | 1.98 | — | — | — |

TABLE 1-continued

| | Item | | Example 1 | Example 2 | Example 3 | Example 4 | Example 5 | Example 6 | Comparative Example 1 | Comparative Example 2 |
|---|---|---|---|---|---|---|---|---|---|---|
| | Phenol compound 3 | 1,3,5-trihydroxybenzene | — | — | 0.99 | — | — | 1.98 | — | — |
| | Phenol compound 4 | hydroquinone | — | — | — | — | — | — | 1.3 | 2.6 |
| | Solvent 1 | cyclohexanone | 80 | 80 | 80 | 80 | 80 | 80 | 80 | 80 |
| | Curing catalyst 1 | triphenyl phosphine | 0.5 | 0.5 | 0.5 | 0.5 | 0.5 | 0.5 | 0.5 | 0.5 |
| Synthesis conditions | Heating temperature [° C.] | | 160 | 160 | 160 | 160 | 160 | 160 | 160 | 160 |
| | Heating time [hr] | | 5 | 5 | 5 | 5 | 5 | 5 | 5 | 5 |
| Properties | Solid content [%] | | 98.2 | 98.5 | 98.3 | 98.5 | 98.4 | 98.3 | 98.8 | 98.7 |
| | Epoxy equivalent [g/eq] | | 263 | 267 | 266 | 300 | 295 | 297 | 256 | 298 |
| | Number-average molecular weight (epoxy polymer) | | 1,500 | 1,500 | 1,550 | 2,300 | 2,400 | 2,450 | 1,300 | 1,900 |
| | Number-average molecular weight (epoxy resin) | | 620 | 650 | 650 | 900 | 900 | 950 | 530 | 650 |
| | Melting point [° C.] | | 130 | 133 | 133 | 122 | 125 | 126 | 135 | 129 |
| | Flow distance [cm] | | 60 | 54 | 57 | 73 | 65 | 70 | 48 | 63 |
| | Specific gravity | | 3.25 | 3.25 | 3.25 | 3.26 | 3.26 | 3.26 | 3.26 | 3.26 |
| | Glass transition temperature [° C.] | | 192 | 200 | 198 | 189 | 195 | 195 | 185 | 160 |
| | Thermal conductivity [W/(m · K)] | | 11.6 | 12.3 | 12.1 | 11.5 | 12.8 | 12.9 | 12.3 | 11.5 |
| | X-ray diffraction* | | N | N | N | N | Sm | Sm | Sm | N |

*N: formation of a nematic phase, Sm: formation of a smectic phase

As shown in Table 1, in Examples 1 to 3 and Comparative Example 1 where the ratio Ep/Ph was the same, the molding materials obtained from the epoxy resins 1 to 3 synthesized in Examples 1 to 3, respectively, all had a higher flow characteristic (spiral flow) value than the molding material obtained from the epoxy resin 7 synthesized in Comparative Example 1.

In addition, in Examples 4 to 6 and Comparative Example 2 where the ratio Ep/Ph was the same, the molding materials obtained from the epoxy resins 4 to 6 synthesized in Examples 4 to 6, respectively, all had a higher flow characteristic (spiral flow) value than the molding material obtained from the epoxy resin 8 synthesized in Comparative Example 2.

In Examples 1 to 6, a high flow characteristic (spiral flow) value was obtained when the phenol compound 1 (1,2,3-trihydroxybenzene) was used as a phenol component.

Moreover, in Examples 1 to 6 and Comparative Examples 1 and 2, the glass transition temperature of each cured product was higher when a phenol compound having three hydroxy groups was used than when a phenol compound having two hydroxy groups was used. This is presumed to be because the crosslinking density of each epoxy resin was improved by the use of a phenol compound having three hydroxy groups.

Further, in Examples 1 to 3 where the ratio Ep/Ph was 10/1, the formation of a smectic phase was not confirmed by X-ray diffractometry; however, in Examples 5 and 6 where the ratio Ep/Ph was 5/1, the formation of a smectic phase was confirmed by X-ray diffractometry, and this resulted in an improvement in the thermal conductivity of each cured product.

The reason why the formation of a smectic phase was not confirmed by X-ray diffractometry in Example 4 where the ratio Ep/Ph was 5/1 is presumed to be because the hydroxy groups of the phenol compound functioning as a binder were closely arranged with one another and the mesogen alignment was thereby inhibited.

All the documents, patent applications and technical standards that are described in the present specification are hereby incorporated by reference to the same extent as if each individual document, patent application or technical standard is concretely and individually described to be incorporated by reference.

The invention claimed is:

1. An epoxy polymer comprising:

a mesogen skeleton; and a structural unit represented by the following Formula (A):

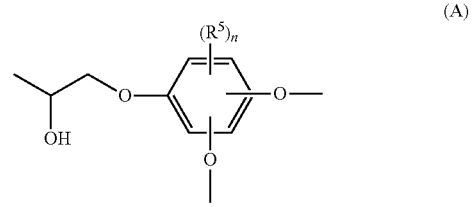

wherein, in Formula (A), each $R^5$ independently represents an alkyl group having from 1 to 8 carbon atoms; and n represents an integer of 0 to 3, wherein the epoxy polymer is a reaction product obtained by reacting an epoxy compound that has a mesogen skeleton and two epoxy groups with a trihydric phenol compound that has three hydroxy groups on a single benzene ring as substituents with a ratio (Ep/Ph) between the number of equivalents of the epoxy groups of the epoxy compound (Ep) and the number of equivalents of the phenolic hydroxy groups of the trihydric phenol compound (Ph) being set in a range of from 100/30 to 100/15, wherein the trihydric phenol compound is at least one selected from the group consisting of 1,2,4-trihydroxybenzene and 1,3,5-trihydroxybenzene, wherein the epoxy polymer includes at least one selected from the group consisting of a structural unit represented by the following Formula (IA) and a structural unit represented by the following Formula (TB):

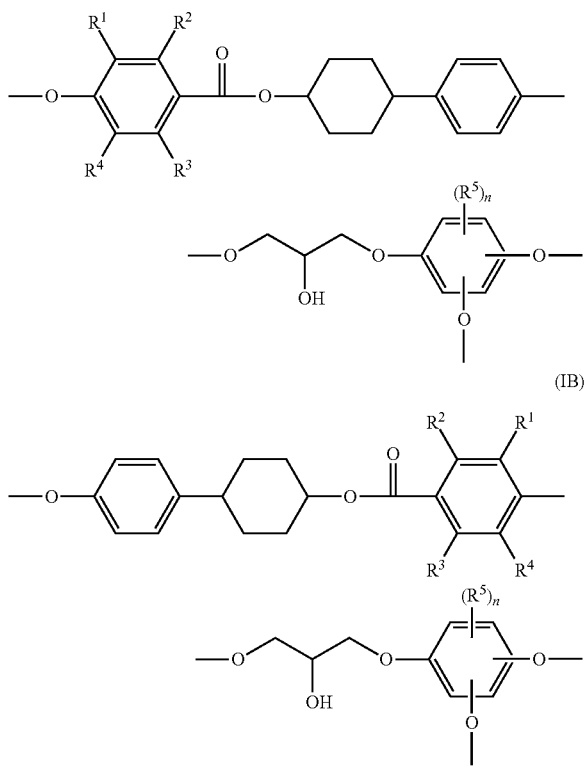

wherein, in Formula (IA) and Formula (TB), each of $R^1$ to $R^4$ independently represents a hydrogen atom or an alkyl group having from 1 to 3 carbon atoms; each $R^5$ independently represents an alkyl group having from 1 to 8 carbon atoms; and n represents an integer of 0 to 3.

2. The epoxy polymer according to claim 1, having a number-average molecular weight of from 1,000 to 3,000 as measured by gel permeation chromatography.

3. The epoxy polymer according to claim 1, wherein the epoxy compound comprises a compound represented by the following Formula (I):

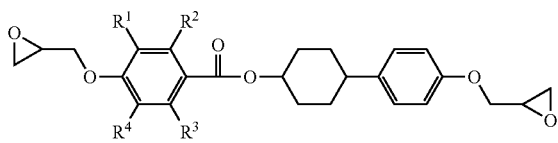

wherein, each of $R^1$ to $R^4$ independently represents a hydrogen atom or an alkyl group having from 1 to 3 carbon atoms.

4. The epoxy polymer according to claim 1, wherein the epoxy compound comprises trans-4-{4-(2,3-epoxypropoxy)phenyl}cyclohexyl=4-(2,3-epoxypropoxy)benzoate.

5. An epoxy resin comprising the epoxy polymer according to claim 1.

6. An epoxy resin composition comprising:
the epoxy resin according to claim 5; and
a filler.

7. A binder of a carbon fiber-reinforced plastic (CFRP) comprising the epoxy resin composition according to claim 6.

8. A sealing material or a molding material comprising the epoxy resin composition according to claim 6.

9. The epoxy resin composition according to claim 6, having a glass transition temperature of 180° C. or higher when made into a cured product.

10. The epoxy resin composition according to claim 6, having a diffraction peak in a diffraction angle (2θ) range of from 3.0° to 3.5° when made into a cured product, as determined by X-ray diffractometry using CuKα radiation.

11. A resin sheet comprising a resin composition layer that contains the epoxy resin composition according to claim 6.

12. A B-stage sheet comprising a semi-cured resin composition layer that contains a semi-cured product of the epoxy resin composition according to claim 6.

13. A C-stage sheet comprising a cured resin composition layer that contains a cured product of the epoxy resin composition according to claim 6.

14. A cured product of the epoxy resin composition according to claim 6.

15. The cured product according to claim 14, having a glass transition temperature of 180° C. or higher.

16. The cured product according to claim 14, having a diffraction peak in a diffraction angle (2θ) range of from 3.0° to 3.5° as determined by X-ray diffractometry using CuKα radiation.

17. A metal foil with a resin, comprising:
a metal foil; and
a semi-cured resin composition layer which is arranged on the metal foil and comprises a semi-cured product of the epoxy resin composition according to claim 6.

18. A metal substrate comprising:
a metal support;
a cured resin composition layer which is arranged on the metal support and comprises a cured product of the epoxy resin composition according to claim 6; and
a metal foil arranged on the cured resin composition layer.

19. A method of producing an epoxy resin containing the epoxy polymer according to claim 1 by allowing the epoxy compound that has a mesogen skeleton and two epoxy groups to react with the trihydric phenol compound that has three hydroxy groups on a single benzene ring as substituents.

20. The method of producing an epoxy resin according to claim 19, wherein the epoxy compound is allowed to react with the trihydric phenol compound, with a ratio (Ep/Ph) between the number of equivalents of the epoxy groups of the epoxy compound (Ep) and the number of equivalents of the phenolic hydroxy groups of the trihydric phenol compound (Ph) being set in a range of from 100/30 to 100/15.

21. The method of producing an epoxy resin according to claim 19, wherein the trihydric phenol compound is at least one selected from the group consisting of 1,2,4-trihydroxybenzene, and 1,3,5-trihydroxybenzene.

* * * * *